(12) United States Patent
Shimizu et al.

(10) Patent No.: US 11,632,071 B2
(45) Date of Patent: Apr. 18, 2023

(54) MOTOR DRIVE DEVICE AND AIR CONDITIONER

(71) Applicant: Mitsubishi Electric Corporation, Tokyo (JP)

(72) Inventors: Yuichi Shimizu, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 118 days.

(21) Appl. No.: 17/424,566

(22) PCT Filed: Feb. 27, 2020

(86) PCT No.: PCT/JP2020/008103
§ 371 (c)(1),
(2) Date: Jul. 21, 2021

(87) PCT Pub. No.: WO2020/175637
PCT Pub. Date: Sep. 3, 2020

(65) Prior Publication Data
US 2022/0077806 A1   Mar. 10, 2022

(30) Foreign Application Priority Data
Feb. 27, 2020  (WO) .................. PCT/JP2019/007643

(51) Int. Cl.
*H02P 27/08* (2006.01)
*H02P 6/04* (2016.01)
(Continued)

(52) U.S. Cl.
CPC ............... *H02P 27/08* (2013.01); *H02P 5/46* (2013.01); *H02P 5/74* (2013.01); *H02P 6/04* (2013.01); *H02P 6/16* (2013.01)

(58) Field of Classification Search
CPC ...... H02P 8/36; H02P 8/38; H02P 8/40; H02P 6/00; H02P 6/005; H02P 6/04; H02P 6/12; H02P 6/24; H02P 6/28; H02P 6/32; H02P 7/00; H02P 7/29; H02P 1/00; H02P 1/30; H02P 1/52; H02P 1/54; H02P 3/00; H02P 21/00; H02P 21/0003; H02P 21/09; H02P 21/18; H02P 21/22; H02P 23/00; H02P 23/0004; H02P 23/08; H02P 23/28; H02P 25/00; H02P 25/022; H02P 25/024;
(Continued)

(56) References Cited

FOREIGN PATENT DOCUMENTS

| JP | S53-139117 A | 12/1978 |
|----|--------------|---------|
| JP | S62-290391 A | 12/1987 |

(Continued)

OTHER PUBLICATIONS

International Search Report dated May 26, 2020, issued in corresponding International Application No. PCT/JP2020/008103.

*Primary Examiner* — Antony M Paul
(74) *Attorney, Agent, or Firm* — Posz Law Group, PLC

(57) ABSTRACT

A motor drive device that drives motors with one inverter includes a step-out control unit that detects step-out in which the operating frequency of at least one of the motors does not match the inverter output frequency, or the operating frequency of at least one of the motors does not match the operating frequency of another one of the motors, and stops the motors by switching an energization state of the inverter when at least one of the motors is out of step.

18 Claims, 17 Drawing Sheets

(51) Int. Cl.
*H02P 6/16* (2016.01)
*H02P 5/46* (2006.01)
*H02P 5/74* (2006.01)

(58) Field of Classification Search
CPC ........ H02P 25/03; H02P 25/066; H02P 25/10; H02P 27/00; H02P 27/04; H02P 27/06; H02P 27/08; H02P 27/085; H02P 2207/05; H02P 29/024
See application file for complete search history.

(56) References Cited

FOREIGN PATENT DOCUMENTS

| | | | | |
|---|---|---|---|---|
| JP | 2001-025282 A | | 1/2001 | |
| JP | 2005-245058 A | | 9/2005 | |
| JP | 2010-022184 A | | 1/2010 | |
| JP | 2010022184 A | * | 1/2010 | ............... H02P 6/04 |
| JP | 2015-023621 A | | 2/2015 | |

* cited by examiner

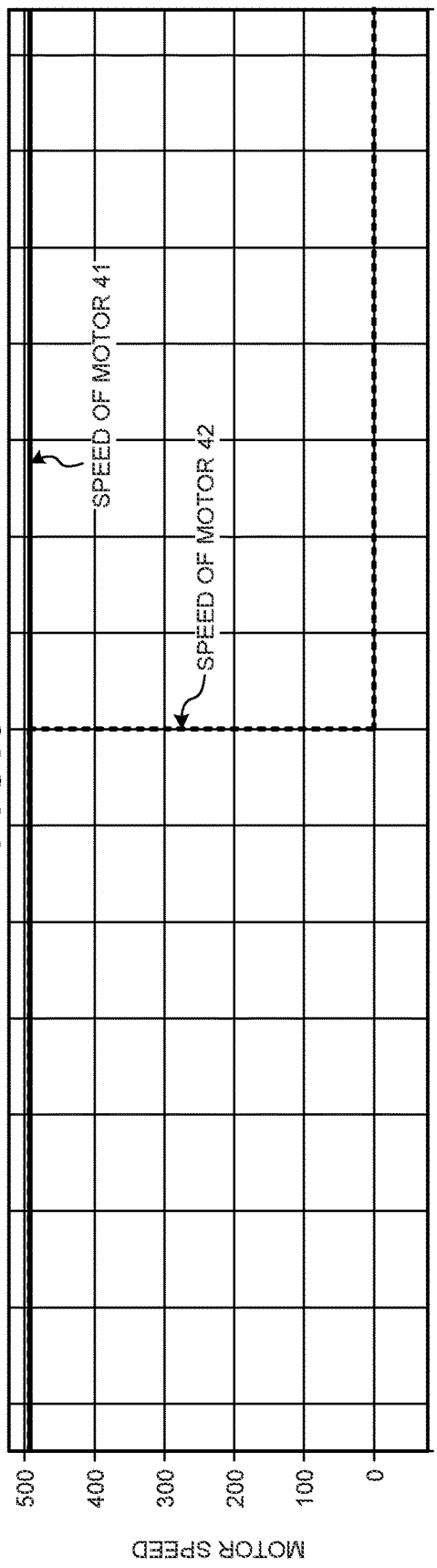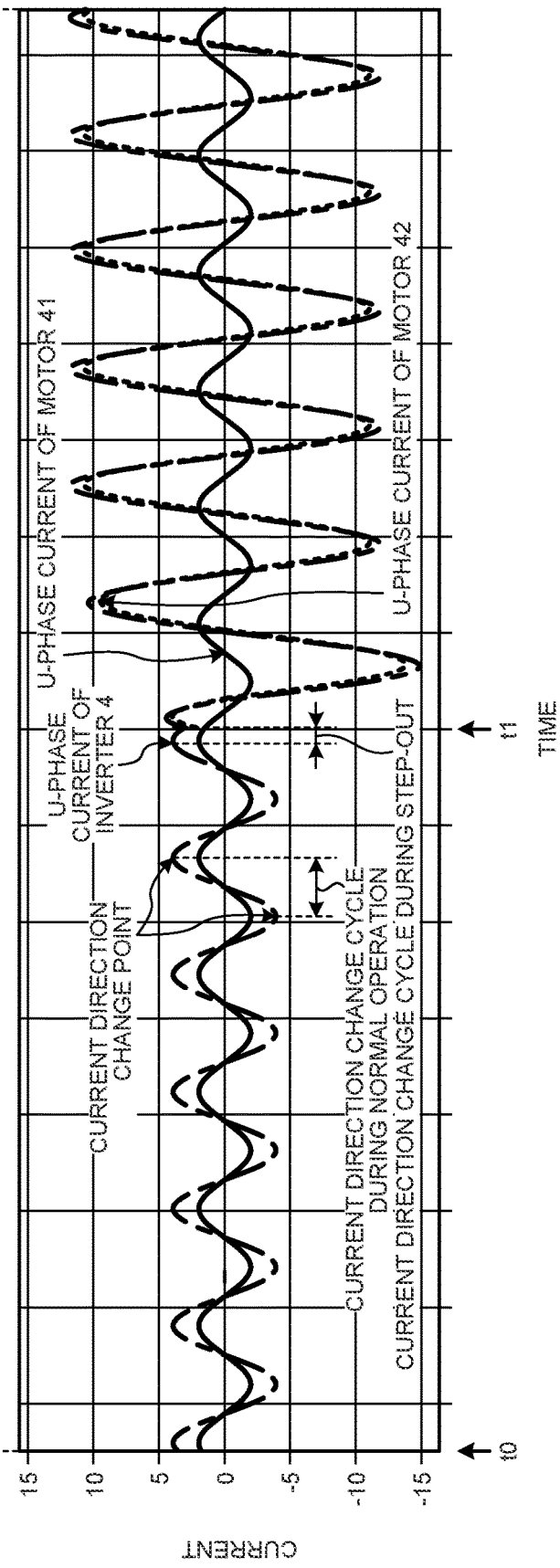
FIG.6

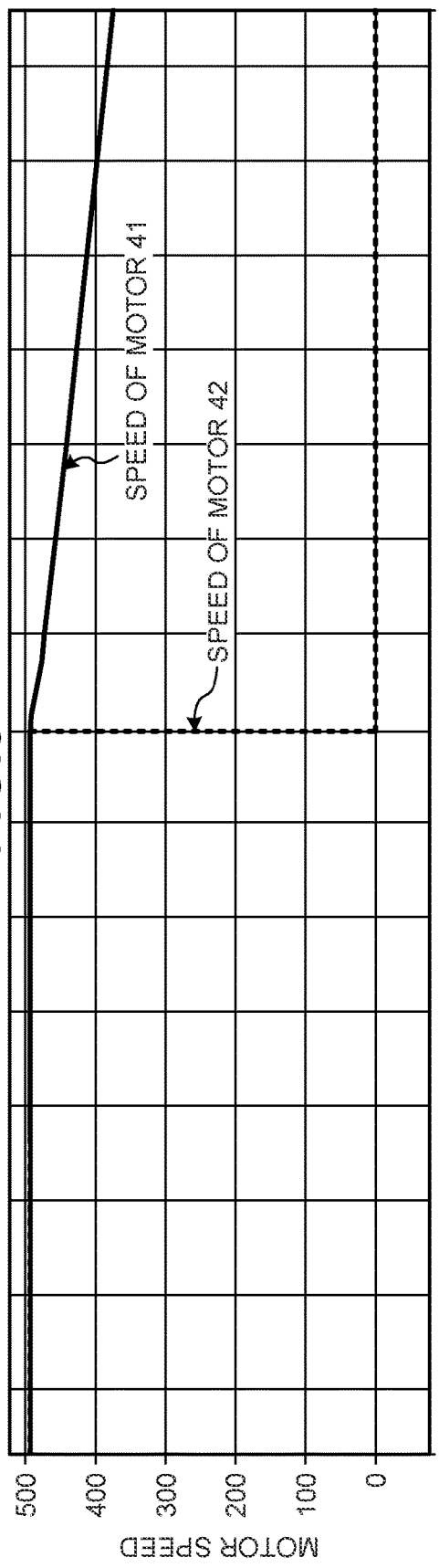
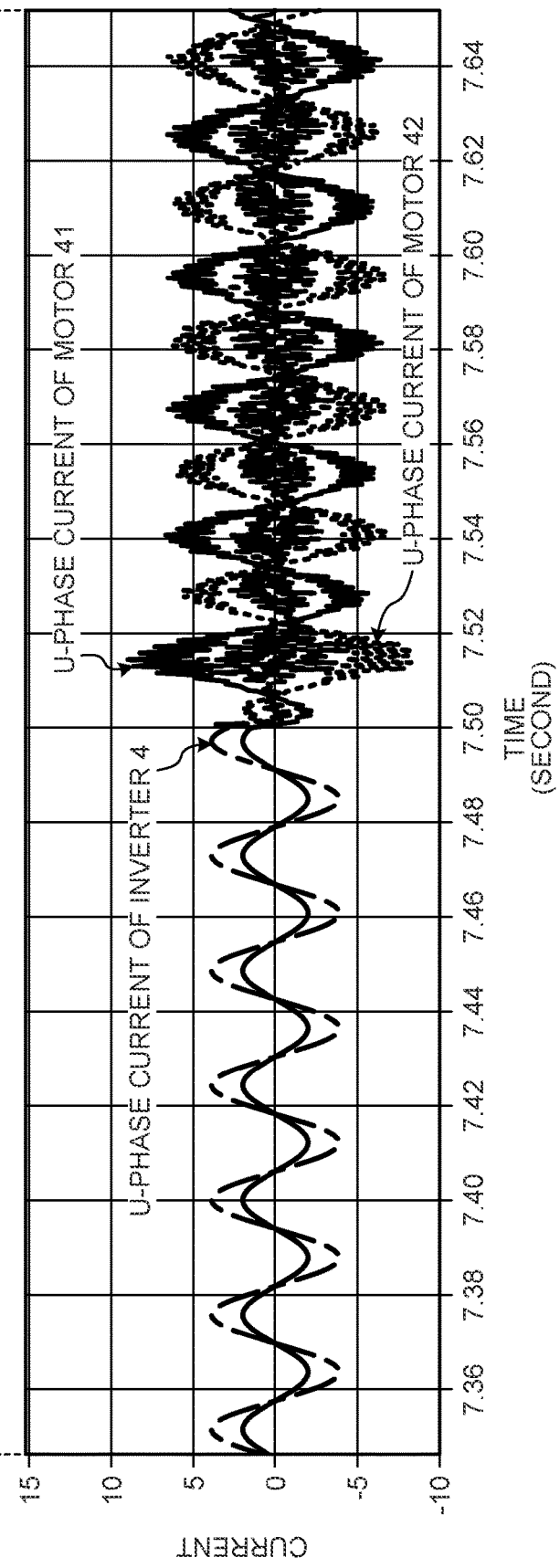
FIG.9

MOTOR DRIVE DEVICE AND AIR CONDITIONER

CROSS REFERENCE TO RELATED APPLICATION

This application is a U.S. National Stage Application of International Patent Application No. PCT/JP2020/008103, filed on Feb. 27, 2020, that claims priority from PCT/JP2019/007643, filed on Feb. 27, 2019, the contents of which are incorporated herein by reference.

TECHNICAL FIELD

The present invention relates to a motor drive device that drives a plurality of motors with one inverter, and to an air conditioner including a motor drive device.

BACKGROUND

When a motor that is driven by a motor drive device is a permanent magnet synchronous motor, for example, position information of the rotor is required to drive the permanent magnet synchronous motor. Therefore, in general, permanent magnet synchronous motors are driven using a position sensor for acquiring the rotor position. However, the use of position sensors may cause problems such as an increase in system size, an increase in cost, and a decrease in environmental resistance. Therefore, permanent magnet synchronous motors need to be driven by applying sensorless control that drives permanent magnet synchronous motors without using a position sensor. There are various methods of sensorless control, a well-known example of which is one that uses the induced voltage during rotation caused by the magnetic flux of the permanent magnet incorporated in the rotor of the motor.

In sensorless control, the error between the estimated position value of the motor rotor and the actual rotor position may increase due to factors such as an excessive load on the motor, causing the motor to fall out of step. When the motor is out of step, it is necessary to temporarily stop the motor and then start the motor again. For this reason, a typical motor drive device includes a means for detecting whether the motor is out of step.

In addition, in the case of driving a plurality of motors with one inverter, it is necessary to perform step-out detection for each motor. Patent Literature 1 below discloses a technique for driving a plurality of motors with one inverter; specifically, the technique includes detecting step-out based on the combined current of the motors, and in response to detecting a step-out condition, performing a restart after the output voltage from the inverter is cut off.

Patent Literature

Patent Literature 1: Japanese Patent Application Laid-open No. 2010-022184

In the case of driving two motors with one inverter, for example, if one of the motors falls out of step, the speed of this motor decreases. As the speed of the motor decreases, the induced voltage of the motor decreases. In the method of Patent Literature 1, control is performed to cut off the output voltage from the inverter when any of the motors is out of step. However, even after the output voltage from the inverter is cut off, the motors are still electrically connected, so there is a risk that excessive current may flow between the plurality of motors according to the difference between the induced voltages of the motors.

SUMMARY

The present invention has been made in view of the above, and an object thereof is to obtain a motor drive device configured to drive a plurality of motors with one inverter and capable of preventing or reducing the excessive current that can flow between the plurality of motors according to the difference between the induced voltages of the motors.

In order to solve the above-mentioned problems and achieve the object, a motor drive device according to the present invention includes one inverter that drives a plurality of motors. The motor drive device also includes a step-out control unit that detects step-out in which the operating frequency of at least one of the motors does not match the inverter output frequency, or the operating frequency of at least one of the motors does not match the operating frequency of another one of the motors, and stops the plurality of motors by switching an energization state of the inverter when at least one of the motors is out of step.

The motor drive device according to the present invention is configured to drive a plurality of motors with one inverter and can achieve the effect of preventing or reducing the excessive current that can flow between the plurality of motors according to the difference between the induced voltages of the motors.

BRIEF DESCRIPTION OF DRAWINGS

FIG. 6 is a diagram illustrating an example of the behavior of each motor that occurs when the second motor of the motors illustrated in FIG. 1 is out of step.

FIG. 9 is a diagram illustrating an example of the behavior of each motor that occurs when control against step-out is performed according to the first embodiment.

DETAILED DESCRIPTION

Hereinafter, a motor drive device and an air conditioner according to embodiments of the present invention will be described with reference to the accompanying drawings. The present invention is not limited to the following embodiments. In the following description, electrical connection and mechanical connection are not distinguished, and will be simply referred to as "connection".

First Embodiment

Figure 1:
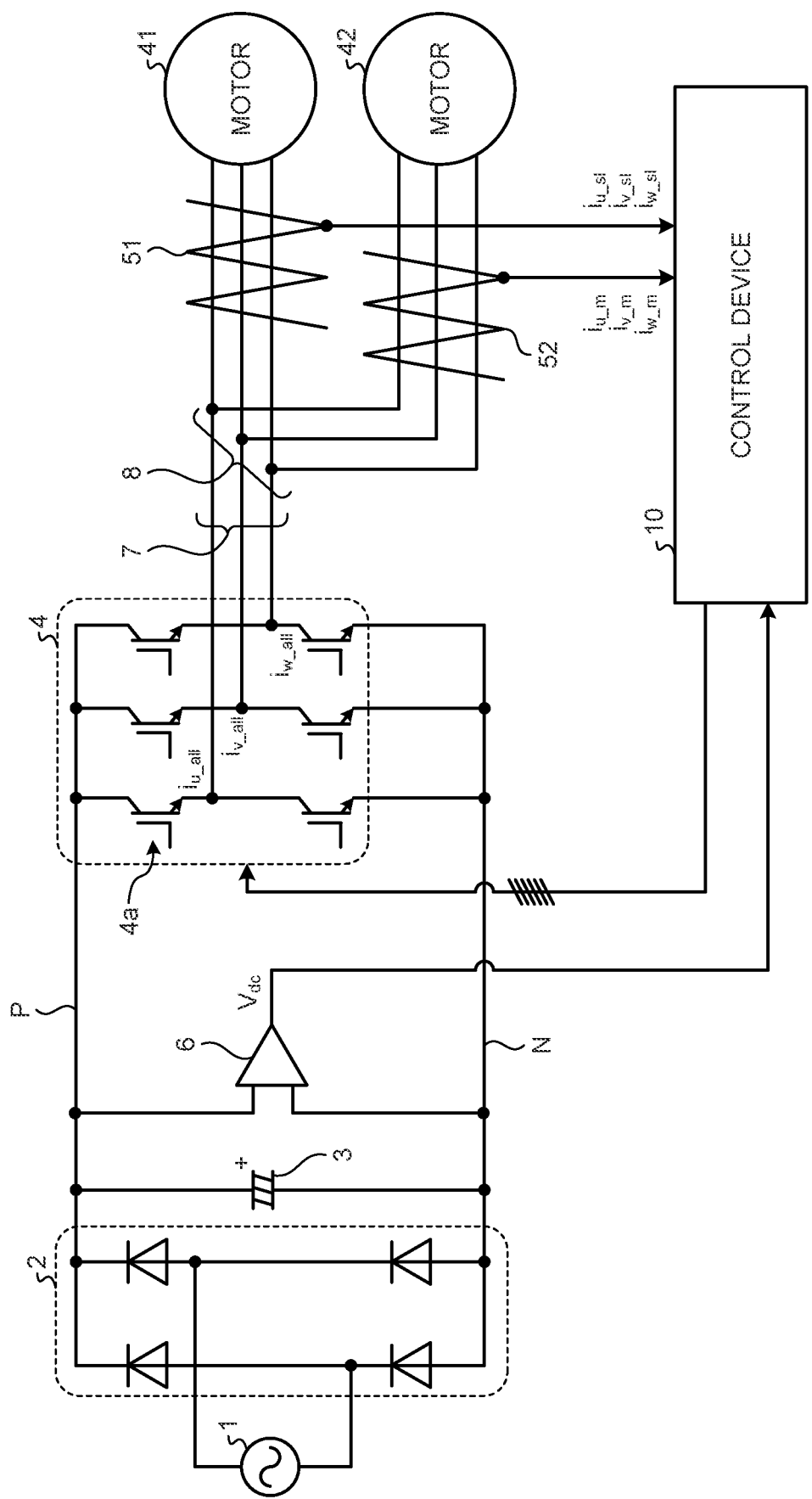
FIG. 1 is a diagram illustrating an exemplary configuration of a motor drive device and its peripheral circuits according to a first embodiment.

FIG. 1 is a diagram illustrating an exemplary configuration of a motor drive device and its peripheral circuits according to the first embodiment. The motor drive device according to the first embodiment is a motor drive device that drives a plurality of motors with one inverter. Two motors 41 and 42 in FIG. 1 are examples of a plurality of motors.

As illustrated in FIG. 1, the motor drive device according to the first embodiment includes an inverter 4 composed of six switching elements 4a, and a smoothing unit 3 that operates as a DC power supply for supplying a DC voltage to the inverter 4. An example of the smoothing unit 3 is a capacitor. The inverter 4 is connected in parallel to the output side of the smoothing unit 3. In the inverter 4, the six switching elements 4a are bridge-connected to form the main circuit of the inverter 4.

An example of the switching element 4a is an insulated gate bipolar transistor (IGBT) as illustrated in the figure, but other switching elements may be used. Another example of the switching element 4a is a metal oxide semiconductor field effect transistor (MOSFET). A rectifier 2 is connected in parallel to the input side of the smoothing unit 3. The rectifier 2 includes four diodes that are bridge-connected. AC power from an AC power supply 1 is supplied to the rectifier 2. AC power from the AC power supply 1 is rectified by the rectifier 2 and then smoothed by the smoothing unit 3, and the smoothed DC power is supplied to the inverter 4.

Note that the AC power supply 1 and the rectifier 2 illustrated in FIG. 1 are of single-phase type, but may be of three-phase type. In addition, as the capacitor of the smoothing unit 3, an aluminum electrolytic capacitor is generally used because of its large capacitance, but a long-life film capacitor may be used. Alternatively, a capacitor with a small capacitance may be used. The use of a capacitor with a small capacitance leads to a reduction in the harmonic current in the current flowing through the AC power supply 1. Further, a reactor may be inserted in the electrical wiring between the AC power supply 1 and the smoothing unit 3 for the purpose of reducing the harmonic current or improving the power factor.

The inverter 4 includes three legs of three phases, each consisting of an upper-arm switching element and a lower-arm switching element connected in series in this order. The three legs are a U-phase leg, a V-phase leg, and a W-phase leg. The U-phase leg, the V-phase leg, and the W-phase leg are connected in parallel between the P line and the N line, which are DC bus lines to which DC power is supplied.

A power line 7 is drawn from the connection end between an upper-arm switching element and a lower-arm switching element. The power line 7 is divided into two at a branch point 8, and the two lines are connected one-to-one to the motor 41 which is a first motor and the motor 42 which is a second motor. An example of the motors 41 and 42 is a three-phase permanent magnet synchronous motor.

The DC power smoothed by the smoothing unit 3 is supplied to the inverter 4, and then converted into a desired three-phase AC power by the inverter 4. The three-phase AC power obtained through conversion is supplied to the motor 41 and the motor 42.

Although FIG. 1 depicts a configuration in which each leg of the inverter 4 has only switching elements, the present invention is not limited to this configuration. For the purpose of reducing the surge voltage generated by the switching operation of a switching element, a freewheeling diode may be connected in antiparallel to the two ends of the switching element. In a case where a switching element is a MOSFET, the parasitic diode of the MOSFET may be used as a freewheeling diode. Further, in a case where a switching element is a MOSFET, the freewheeling function can be implemented with the switching element alone by turning on the MOSFET at the timing of flyback. Moreover, materials for a switching element may include not only silicon (Si) but also silicon carbide (SiC), gallium nitride (GaN), gallium oxide ($Ga_2O_3$), diamond, and the like, which are wide bandgap semiconductors. Forming a switching element from a wide bandgap semiconductor material contributes to achieving low loss and high-speed switching.

Next, the sensors required for controlling the inverter 4 will be described. In FIG. 1, a current detection unit 51 is a current sensor that detects the three-phase motor current flowing through the motor 41, and a current detection unit 52 is a current sensor that detects the three-phase motor current flowing through the motor 42. An input voltage detection unit 6 is a bus voltage sensor that detects a DC bus voltage $V_{dc}$, i.e. the voltage between the P line and the N line, which are DC bus lines.

A control device 10 performs motor control calculation based on motor currents $i_{u\_m}$, $i_{v\_m}$, and $i_{w\_m}$ detected by the current detection unit 51, motor currents $i_{u\_sl}$, $i_{v\_sl}$, and $i_{w\_sl}$ detected by the current detection unit 52, and the DC bus voltage $V_{dc}$ detected by the input voltage detection unit 6, and generates a drive signal for each switching element of the inverter 4.

The current detection units 51 and 52 are exemplified by, but not limited to, current transformers. Instead of using current transformers, a method of detecting a motor current from the voltage across a resistor may be adopted. In addition, either the current detection unit 51 or the current detection unit 52 may adopt a configuration in which a resistor for current detection is provided between the lower-arm switching element of the inverter 4 and the connection point of the three lower-arm switching elements, or a configuration in which a resistor for current detection is provided between the connection point of the three lower-arm switching elements and the connection point with the N line, which is the negative DC bus line, to which the capacitor is connected.

Although FIG. 1 depicts a configuration having two motors, there may be three or more motors. Needless to say, each of the three or more motors is equipped with a current sensor that detects motor current.

Although the number of inverters is one in FIG. 1, a plurality of inverters may be provided. Each of the plurality of inverters uses the P line and the N line, which are DC bus lines, as common bus lines, and is connected between the P line and the N line, namely the common bus lines.

Figure 2:
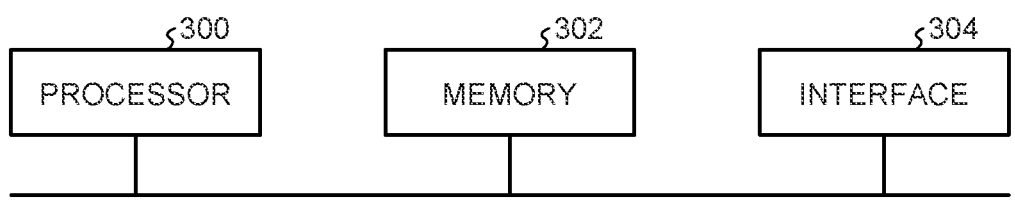
FIG. 2 is a block diagram illustrating an example of a hardware configuration for implementing the function of the control device of FIG. 1.
Figure 3:
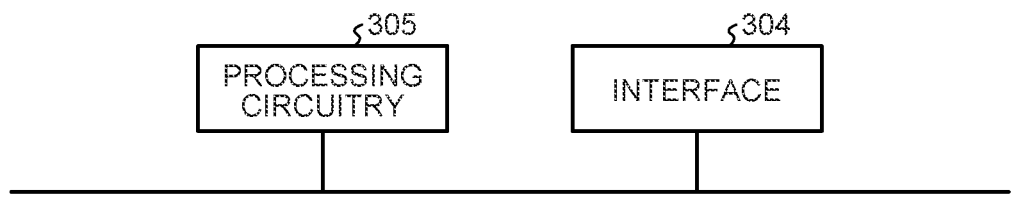
FIG. 3 is a block diagram illustrating another example of a hardware configuration for implementing the function of the control device of FIG. 1.

FIG. 2 is a block diagram illustrating an example of a hardware configuration for implementing the function of the control device 10 of FIG. 1. FIG. 3 is a block diagram illustrating another example of a hardware configuration for implementing the function of the control device 10 of FIG. 1.

The function of motor control by the control device 10 described below can be implemented with a configuration including a processor 300, a memory 302, and an interface 304 as illustrated in FIG. 2. The processor 300 performs calculation. Programs that are read by the processor 300 are saved in the memory 302. Signals are input and output through the interface 304.

The processor 300 may be a calculation means such as a calculation device, a microcomputer, a microcomputer, a central processing unit (CPU), or a digital signal processor (DSP). Examples of the memory 302 include non-volatile or volatile semiconductor memories such as a random access memory (RAM), a read only memory (ROM), a flash memory, an erasable programmable ROM (EPROM), and an electrically EPROM (EEPROM, registered trademark).

Specifically, the memory 302 stores a program that executes the function of motor control in the control device 10. Necessary information is sent and received via the interface 304, the processor 300 executes the program stored in the memory 302, and the processor 300 refers to a table stored in the memory 302, whereby the processor 300 can execute the motor control described below. The calculation result by the processor 300 can be stored in the memory 302.

The processor 300 and the memory 302 illustrated in FIG. 2 may be replaced with a processing circuitry 305 as illustrated in FIG. 3. For example, the processing circuitry 305 is a single circuit, a composite circuit, an application specific integrated circuit (ASIC), a field-programmable gate array (FPGA), or a combination thereof. Information can be input to the processing circuitry 305 or output from the processing circuitry 305 via the interface 304.

Figure 4:
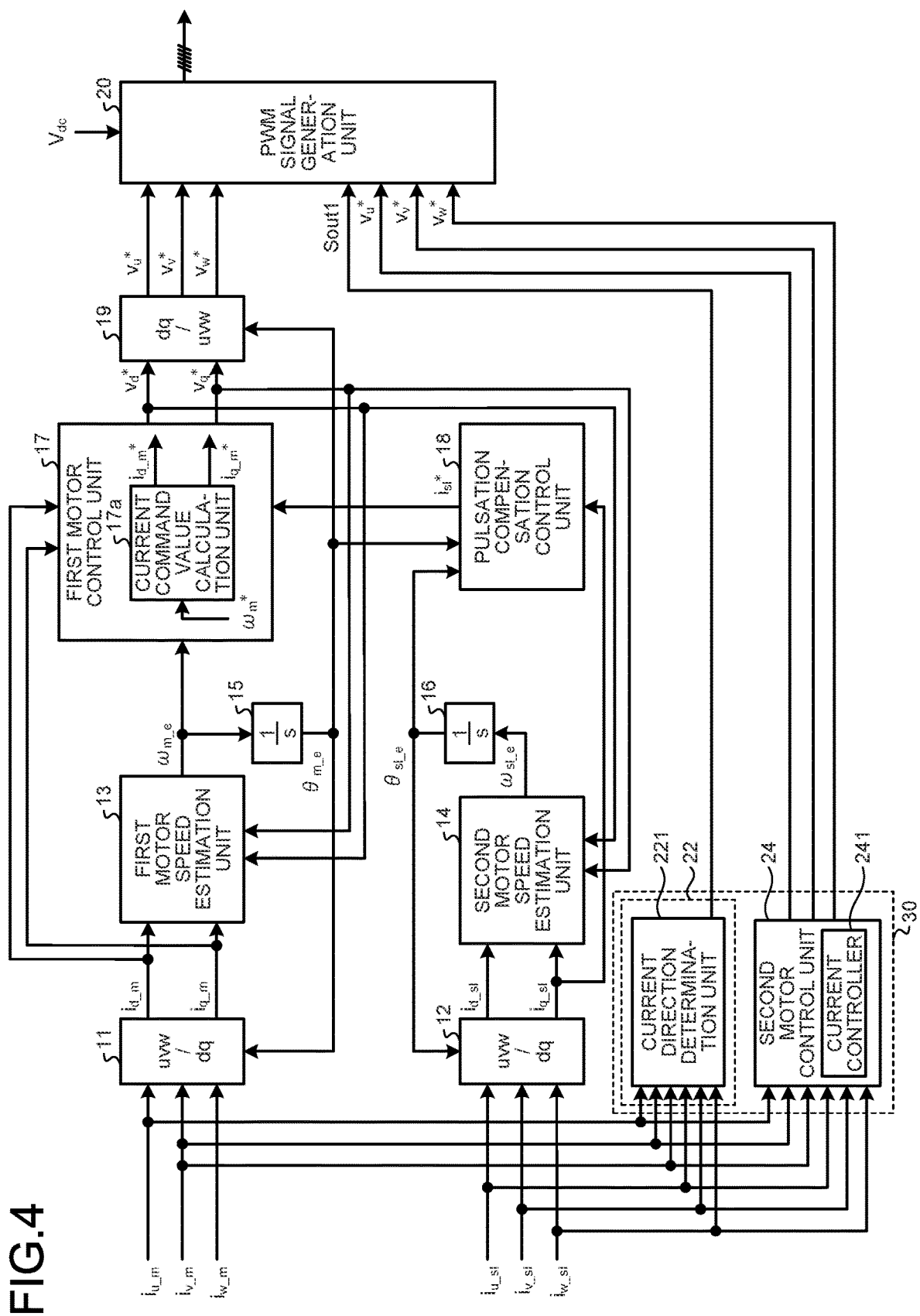
FIG. 4 is a block diagram illustrating an exemplary configuration of a control system constructed in the control device of FIG. 1.
Figure 5:
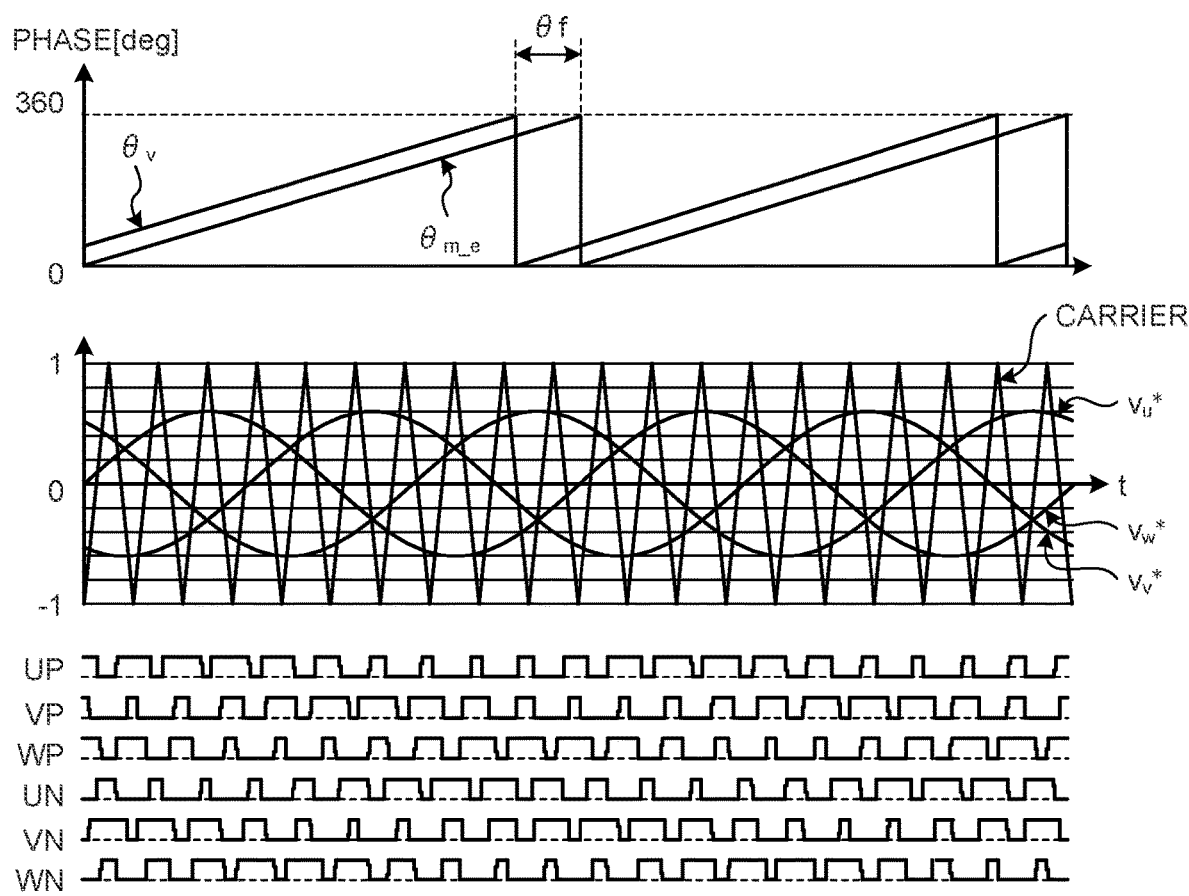
FIG. 5 is a diagram for explaining the operation of the pulse width modulation (hereinafter referred to as "PWM") signal generation unit illustrated in FIG. 4.

Next, motor control that is executed by the control device 10, which is one of the main features of the present invention, will be described with reference to FIGS. 1, 4, and 5. FIG. 4 is a block diagram illustrating an exemplary configuration of a control system constructed in the control device 10 of FIG. 1. FIG. 5 is a diagram for explaining the operation of a PWM signal generation unit 20 illustrated in FIG. 4.

The control device 10 includes coordinate conversion units (denoted as "uvw/dq" in FIG. 4) 11 and 12, a first motor speed estimation unit 13, a second motor speed estimation unit 14, integrators 15 and 16, a first motor control unit 17, a pulsation compensation control unit 18, a coordinate conversion unit (denoted as "dq/uvw" in FIG. 4) 19, the PWM signal generation unit 20, and a step-out control unit 30. The step-out control unit 30 includes a step-out detection unit 22 and a second motor control unit 24. The first motor control unit 17 includes a current command value calculation unit 17a, the step-out detection unit 22 includes a current direction determination unit 221, and the second motor control unit 24 includes a current controller 241.

The step-out detection unit 22 detects whether at least one of the motors 41 and 42, which are examples of a plurality of motors, is out of step. The phrase "at least one of the motors is out of step" as used herein means the occurrence of at least one of the following events (1) to (3).

(1) The inverter output frequency and the operating frequency of the motor 41 do not match.

(2) The inverter output frequency and the operating frequency of the motor 42 do not match.

(3) The operating frequency of the motor 41 and the operating frequency of the motor 42 do not match.

In the case of three or more motors, the above phrase "at least one of the motors is out of step" means that the operating frequency of at least one of the motors does not match the inverter output frequency, or the operating frequency of at least one of the motors does not match the operating frequency of another one of the motors.

The "inverter output frequency" mentioned above is the frequency of the voltage applied by the inverter 4 to the motors 41 and 42. The inverter output frequency is equivalent to a motor speed command value $\omega_m^*$ described later. The motor speed command value may be rephrased as a "rotation speed command value" or a "rotation speed command". In addition, the "operating frequency" mentioned above is equivalent to the motor rotation frequency. Note that the detection of whether the comparison targets do not match can be performed based on the information of the difference between the frequencies of the comparison targets or the information of the ratio between the comparison targets. In the present embodiment, however, a different method is used. Details will be described later.

When at least one of the motors is out of step, the second motor control unit 24 performs control to stop the motors by switching the energization state of the inverter 4. Regarding the switching of the energization state, the first embodiment describes an exemplary method for switching and controlling the voltage command values to be input to the PWM signal generation unit 20.

Next, the operation of each component of the control device 10 will be described. First, the coordinate conversion unit 11 receives input of the motor currents $i_{u\_m}$, $i_{v\_m}$, and $i_{w\_m}$, which are the current values of the stationary three-phase coordinate system detected by the current detection unit 51. The coordinate conversion unit 11 converts the motor currents $i_{u\_m}$, $i_{v\_m}$, and $i_{w\_m}$ into motor dq-axis currents $i_{d\_m}$ and $i_{q\_m}$ using a motor phase estimated value $\theta_{m\_e}$ described later. Here, the motor dq-axis currents $i_{d\_m}$ and $i_{q\_m}$ are current values of the rotating two-phase coordinate system in the motor 41. The motor dq-axis currents $i_{d\_m}$ and $i_{q\_m}$ obtained through conversion by the coordinate conversion unit 11 are input to the first motor speed estimation unit 13 and the first motor control unit 17.

In addition, the coordinate conversion unit 12 receives input of the motor currents $i_{u\_sl}$, $i_{v\_sl}$, and $i_{w\_sl}$, which are the current values of the stationary three-phase coordinate system detected by the current detection unit 52. The coordinate conversion unit 12 converts the motor currents $i_{u\_sl}$, $i_{v\_sl}$, and $i_{w\_sl}$ into motor dq-axis currents $i_{d\_sl}$ and $i_{q\_sl}$. Here, the motor dq-axis currents $i_{d\_sl}$ and $i_{q\_sl}$ are current values of the rotating two-phase coordinate system in the motor 42. The motor dq-axis currents $i_{d\_sl}$ and $i_{q\_sl}$ obtained through conversion by the coordinate conversion unit 12 are input to the second motor speed estimation unit 14 and the pulsation compensation control unit 18.

The first motor speed estimation unit 13 estimates a motor speed estimated value $\omega_{m\_e}$ based on the motor dq-axis currents $i_{d\_m}$ and $i_{q\_m}$. The integrator 15 calculates the motor phase estimated value $\theta_{m\_e}$ by integrating the motor speed estimated value $\omega_{m\_e}$. The calculated motor phase estimated value $\theta_{m\_e}$ is input to the coordinate conversion unit 11, the pulsation compensation control unit 18, and the coordinate conversion unit 19 for coordinate conversion of current values, coordinate conversion of voltage command values, and pulsation compensation control (described later).

The second motor speed estimation unit 14 estimates a motor speed estimated value $\omega_{sl\_e}$ based on the motor dq-axis currents $i_{d\_sl}$ and $i_{q\_sl}$. The integrator 16 calculates a motor phase estimated value $\theta_{sl\_e}$ by integrating the motor speed estimated value $\omega_{sl\_e}$. The calculated motor phase estimated value $\theta_{sl\_e}$ is input to the coordinate conversion unit 12 and the pulsation compensation control unit 18 for coordinate conversion of current values and pulsation compensation control (described later).

Note that the method for calculating motor speed estimated values and motor phase estimated values is known, and a detailed description thereof is omitted here. For details of the method for calculating each estimated value, refer to Japanese Patent No. 4672236, for example. The contents of this publication are incorporated in the present specification and form a part of the present specification. In addition, the method for calculating each estimated value is not limited to the contents of the publication, and any method may be used as long as estimated values of motor speed and motor phase can be obtained. Moreover, any information may be used in calculations as long as estimated values of motor speed and motor phase can be obtained, and the information described here may be omitted, or other information may be used.

If the pulsation compensation control unit 18 is not provided, the first motor control unit 17 calculates dq-axis voltage command values $v_d^*$ and $v_q^*$ based on the motor dq-axis currents $i_{d\_m}$ and $i_{q\_m}$ and the motor speed estimated value $\omega_{m\_e}$. Then, the coordinate conversion unit 19 converts the dq-axis voltage command values $v_d^*$ and $v_q^*$ of the rotating two-phase coordinate system in the motor 41 into voltage command values $v_u^*$, $v_v^*$, and $v_w^*$ of the stationary three-phase coordinate system based on a voltage phase $\theta_v$ obtained based on the motor phase estimated value $\theta_{m\_e}$ and the dq-axis voltage command values $v_d^*$ and $v_q^*$. The voltage phase $\theta_v$ is the phase angle of the voltage command values in the rotating two-phase coordinate system. The upper part of FIG. 5 depicts the relationship between the motor phase estimated value $\theta_{m\_e}$, a phase difference $\theta_f$ by phase control, and the voltage phase $\theta_v$. As illustrated in the upper part of FIG. 5, the voltage phase $\theta_v$, the motor phase estimated value $\theta_{m\_e}$, and the phase difference $\theta_f$ have the relationship of $\theta_v = \theta_{m\_e} - \theta_f$.

The PWM signal generation unit 20 generates PWM signals for PWM control of the switching elements of the inverter 4 based on the voltage command values $v_u^*$, $v_v^*$, and $v_w^*$ and the DC bus voltage $V_{dc}$. The lower part of FIG. 5 depicts an example of PWM signals. UP is a PWM signal for controlling the upper-arm switching element of the U phase of the inverter 4, and UN is a PWM signal for controlling the lower-arm switching element of the U phase of the inverter 4. Similarly, VP and VN are PWM signals for controlling the upper-arm switching element of the V phase and the lower-arm switching element of the V phase, respectively, and WP and WN are PWM signals for controlling the upper-arm switching element of the W phase and the lower-arm switching element of the W phase, respectively. As illustrated in the middle part of FIG. 5, these PWM signals can be generated based on the magnitude relationship between the three-phase voltage command values $v_u^*$, $v_v^*$, and $v_w^*$ and the carrier.

Here, the above control, that is, the control for the case that the pulsation compensation control unit 18 is not provided, only results in the motor 42 being driven according to the voltage command values calculated relative to the motor 41. Therefore, the motor 41 operates as a master motor, and the motor 42 operates as a slave motor. At this time, a phase difference called an axial error may occur between the motor dq-axis currents $i_{d\_m}$ and $i_{q\_m}$ of the motor 41 and the motor dq-axis currents $i_{d\_sl}$ and $i_{q\_sl}$ of the motor 42, depending on the state of control by the inverter 4. By finding the axial error, it is possible to grasp the phase delay or advance between the motor phase estimated value $\theta_{m\_e}$ and the motor phase estimated value $\theta_{sl\_e}$.

Here, in a state of control in which an axial error occurs between the motor dq-axis currents $i_{d\_m}$ and $i_{q\_m}$ of the motor 41 and the motor dq-axis currents $i_{d\_sl}$ and $i_{q\_sl}$ of the motor 42, the motor current of the motor 42, namely the slave motor, may pulsate especially in the low-speed region of motor speed. The current pulsation may cause the motor 42 to fall out of step, and lead to an increased loss of the motor 42 due to heat generation associated with excessive current, or cause a circuit interruption due to excessive current, resulting in a situation where not only the motor 42 but also the motor 41 must be stopped. In order to eliminate, prevent, or reduce this current pulsation, the pulsation compensation control unit 18 is provided.

The pulsation compensation control unit 18 generates a pulsation compensation current command value $i_{sl}^*$ based on the motor phase estimated value $\theta_{m\_e}$ in the motor 41, the motor phase estimated value $\theta_{sl\_e}$ in the motor 42, and the motor q-axis current $i_{q\_sl}$ of the motor 42. The above-mentioned axial error can be found using the information of the motor phase estimated value $\theta_{m\_e}$ of the motor 41 and the motor phase estimated value $\theta_{sl\_e}$ of the motor 42. Then, based on this axial error information, the pulsation compensation current command value $i_{sl}^*$ is generated for preventing or reducing the pulsation of the motor q-axis current $i_{q\_sl}$ corresponding to the torque current of the motor 42.

The pulsation compensation current command value $i_{sl}^*$ generated by the pulsation compensation control unit 18 is given to the first motor control unit 17. In the first motor control unit 17, the current command value calculation unit 17a calculates a q-axis current command value $i_{q\_m}^*$ for the motor 41 by controlling the difference between the motor speed command value $\omega_m^*$ for the motor 41 and the motor speed estimated value $\omega_{m\_e}$ of the motor 41 by proportional integral control or the like. The current command value calculation unit 17a also calculates a d-axis current command value $i_{d\_m}^*$ based on the pulsation compensation current command value $i_{sl}^*$. Regarding the d-axis current command value $i_{d\_m}^*$, which is an exciting current component for the motor 41, the current phase can be controlled by changing the value. Therefore, the motor 41 can be driven with a stronger magnetic flux or a weaker magnetic flux by using the voltage command values $v_u^*$, $v_v^*$, and $v_w^*$ generated based on the d-axis current command value $i_{d\_m}^*$ which is variable. By utilizing this characteristic and reflecting the pulsation compensation current command value $i_{sl}^*$ in the d-axis current command value $i_{d\_m}^*$, current pulsation can be prevented or reduced.

In the first motor control unit 17, the dq-axis voltage command values $v_d^*$ and $v_q^*$ can be calculated by proportional integral control of the difference between the motor dq-axis currents $i_{d\_m}$ and $i_{q\_m}$ and the dq-axis current command values $i_{d\_m}*$ and $i_{q\_m}*$. Note that any method may be used as long as the same function can be implemented. The above operation enables the motor 41 and the motor 42 to be driven with the one inverter 4 while preventing or reducing current pulsation that may occur in the motor 42, namely the slave motor.

Next, the operation of the main part of the motor drive device according to the first embodiment will be described. First, the behavior of the motors associated with motor step-out will be described. FIG. 6 is a diagram illustrating an example of the behavior of each motor that occurs when the motor 42, which is the second motor of the motors illustrated in FIG. 1, is out of step. In FIG. 6, the horizontal axis represents time, the vertical axis of the waveforms in the upper part represents motor speed, and the vertical axis of the waveforms in the lower part represents current. Among the waveforms in the upper part, the thick solid line indicates the speed of the motor 41, and the thick broken line indicates the speed of the motor 42. Among the waveforms in the lower part, the thick solid line indicates the U-phase current of the motor 41, the thick broken line indicates the U-phase current of the motor 42, and the alternate long and short dash line indicates the U-phase current output from the inverter 4.

In FIG. 6, the motors 41 and 42 are appropriately controlled between time t0 and time t1. Therefore, the motor speed, motor current amplitude, and motor current frequency of each of the motors 41 and 42 are all stable. On the other hand, in FIG. 6, the motor 42 falls out of step and decreases in motor speed at time t1. Here, as the motor speed of the motor 42 decreases, the induced voltage of the motor 42 decreases. Because the motor current is proportional to the difference between the output voltage of the inverter 4 and the motor induced voltage, the current amplitude of the motor 42 that is out of step becomes large. In addition, because the motor 42 that is out of step undergoes a change in motor speed and motor induced voltage phase, the direction of the motor current in the motor 42 changes. Therefore, by detecting the change in the direction of the motor current in the motor 42 that is out of step, it is possible to detect the step-out of the motor 42. This function is accomplished by the current direction determination unit 221 of the step-out detection unit 22 described above.

Figure 7:
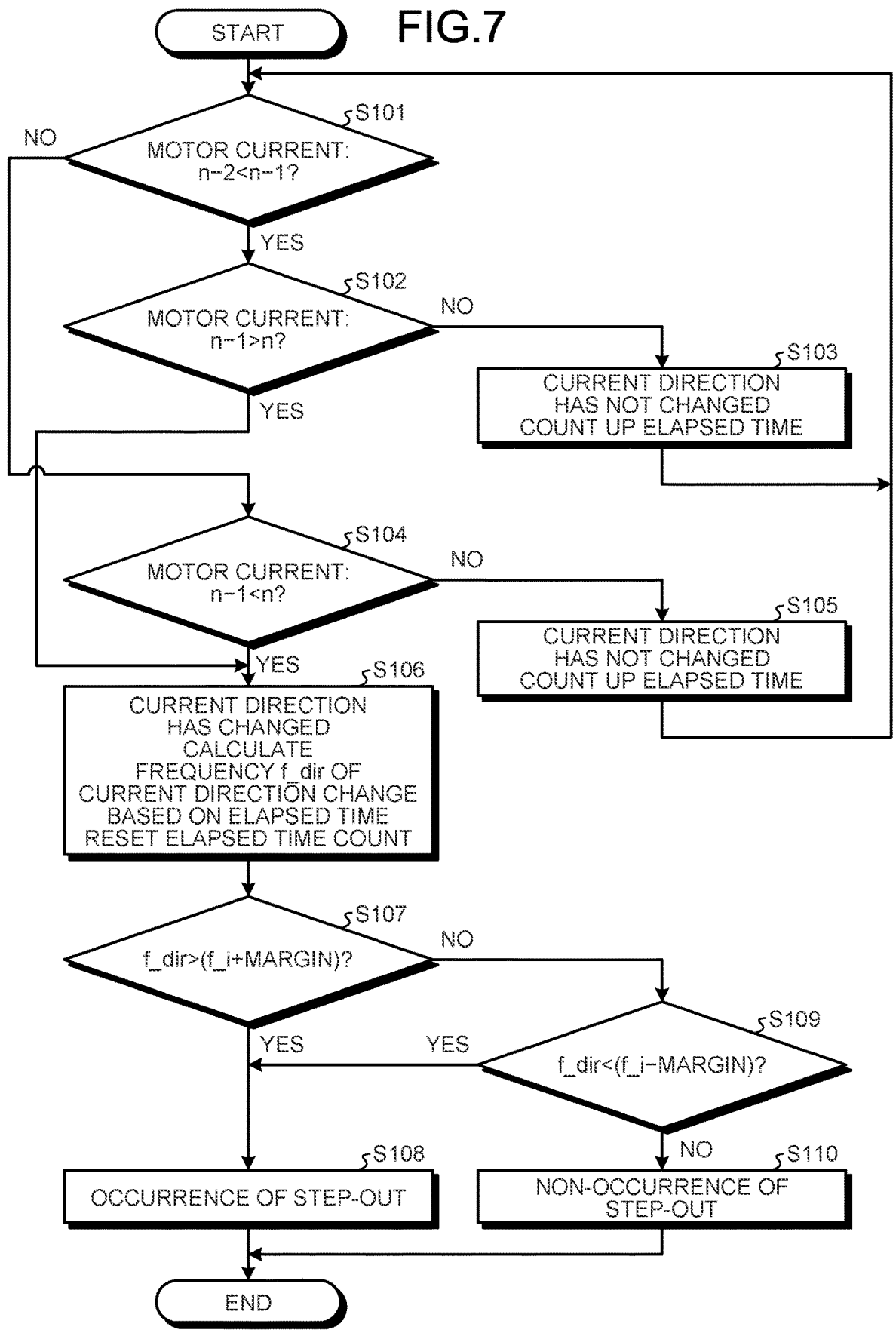
FIG. 7 is a flowchart for explaining the operation of a step-out detection unit according to the first embodiment.

Next, the operation of the step-out detection unit 22 according to the first embodiment will be described. FIG. 7 is a flowchart for explaining the operation of the step-out detection unit 22 according to the first embodiment. Every step in FIG. 7 is performed by the current direction determination unit 221. In FIG. 7, motor current determination is performed for each motor and for each of the three-phase currents. In order to carry out the procedure of the flowchart of FIG. 7, the step-out detection unit 22 receives input of the motor currents $i_{u\_m}$, $i_{v\_m}$, and $i_{w\_m}$ detected by the current detection unit 51 and input of the motor currents $i_{u\_sl}$, $i_{v\_sl}$, and $i_{w\_sl}$ detected by the current detection unit 52. At the time of determination, upon selecting "Yes" for the motor current of at least one phase, the procedure proceeds to the "Yes" side. In addition, upon selecting "No" for the motor currents of all phases of all motors, the procedure proceeds to the "No" side. The following description refers to the motor current of one phase for the sake of simplicity.

In step S101, the n−2 value and the n−1 value of motor current are compared, where "n" represents the latest execution of motor current detection, "n−1" represents the previous execution of motor current detection, and "n−2" represents the execution of motor current detection before the previous execution. Then, in response to determining that the n−2 value is less than the n−1 value (step S101: Yes), the procedure proceeds to step S102. In step S102, the n−1 value and the n value of motor current are compared, and in response to determining that the n−1 value is less than or equal to the n value (step S102: No), the procedure proceeds to step S103. In step S103, it is determined that the current direction has not changed, the elapsed time is counted up, and the procedure returns to step S101.

In step S101, in response to determining that the n−2 value of motor current is larger than or equal to the n−1 value (step S101: No), the procedure proceeds to step S104. In step S104, the n−1 value and the n value of motor current are compared, and in response to determining that the n−1 value is larger than or equal to the n value (step S104: No), the procedure proceeds to step S105. In step S105, it is determined that the current direction has not changed, the elapsed time is counted up, and the procedure returns to step S101.

Next, in step S102, in response to determining that the n−1 value of motor current is larger than the n value (step S102: Yes), the procedure proceeds to step S106. In step S104, in response to determining that the n−1 value of motor current is less than the n value (step S104: Yes), the procedure proceeds to step S106.

Steps S101, S102, and S104 described above are a process of determining whether one motor current has undergone both a change from the decreasing direction to the increasing direction and a change from the increasing direction to the decreasing direction. Then, in response to detecting such two-directional changes, it is determined that the current direction has changed.

In step S106, it is determined that the current direction has changed. In addition, in step S106, a frequency f_dir of the motor current determined to have undergone the current direction change is calculated based on the elapsed time. Further, in step S106, the count of the elapsed time is reset.

In step S107, the frequency f_dir of the motor current is compared with a preset threshold f_i. For determining the magnitude relationship with the threshold f_i, it is preferable to provide a margin to the threshold f_i in order to prevent erroneous determinations or inconsistent determinations. In addition, in order to prevent erroneous determinations due to noise or the like, each detected value from the current detection units 51 and 52 may be filtered by a low-pass filter or the like.

In step S107, in response to determining that the frequency f_dir of the motor current is larger than the threshold (f_i+margin) (step S107: Yes), the procedure proceeds to step S108.

In contrast, in response to determining in step S107 that the frequency f_dir of the motor current is less than or equal to the threshold (f_i+margin) (step S107: No), the procedure proceeds to step S109. Then, in step S109, in response to determining that the frequency f_dir of the motor current is less than the threshold (f_i−margin) (step S109: Yes), the procedure proceeds to step S108, and in response to determining that the frequency f_dir of the motor current is larger than or equal to the threshold (f_i−margin) (step S109: No), the procedure proceeds to step S110.

In step S108, a measure for step-out which will be described later is performed, and the procedure of the flowchart of FIG. 7 ends. Note that a determination result Sout1 indicating the occurrence or non-occurrence of step-out is input to the PWM signal generation unit 20, as illustrated in FIG. 4. In step S110, it is determined that step-out has not occurred, and the procedure of the flowchart of FIG. 7 ends.

Below is a supplement to step S106 above. When the motor is operating normally, the motor current is a sine wave, so changes in current direction occur at the peaks and troughs of the sine wave. Therefore, during normal operation of the motor, the current direction changes at a frequency twice the motor current frequency. In addition, as illustrated in the waveforms in the lower part of FIG. 6, the cycle of changes in current direction during normal operation is generally larger than the cycle of changes in current direction during step-out. Therefore, whether step-out has occurred can be determined by setting the threshold f_i to the frequency twice the motor current frequency and comparing the calculated frequency f_dir of the motor current with the threshold f_i.

Depending on the behavior of the motor that is out of step, the frequency of changes in current direction may be lower than the frequency twice the motor current frequency. This is why the flowchart of FIG. 7 includes step S109.

In the determination process of step S101 described above, the case where the n−2 value of motor current is equal to the n−1 value is classified as "No", but this case may be classified as "Yes". That is, the case where the n−2 value and the n−1 value of motor current are equal may be classified as either "Yes" or "No".

In the determination process of step S102 described above, the case where the n−1 value of motor current is equal to the n value is classified as "No", but this case may be classified as "Yes". That is, the case where the n−1 value and the n value of motor current are equal may be classified as either "Yes" or "No".

In the determination process of step S104 described above, the case where the n−1 value of motor current is equal to the n value is classified as "No", but this case may be classified as "Yes". That is, the case where the n−1 value and the n value of motor current are equal may be classified as either "Yes" or "No".

In the determination process of step S107 described above, the case where the frequency f_dir of the motor current is equal to the threshold (f_i+margin) is classified as "No", but this case may be classified as "Yes". That is, the case where the frequency f_dir of the motor current and the threshold (f_i+margin) are equal may be classified as either "Yes" or "No".

In the determination process of step S109 described above, the case where the frequency f_dir of the motor current is equal to the threshold (f_i−margin) is classified as "No", but this case may be classified as "Yes". That is, the case where the frequency f_dir of the motor current and the threshold (f_i−margin) are equal may be classified as either "Yes" or "No".

Figure 8:
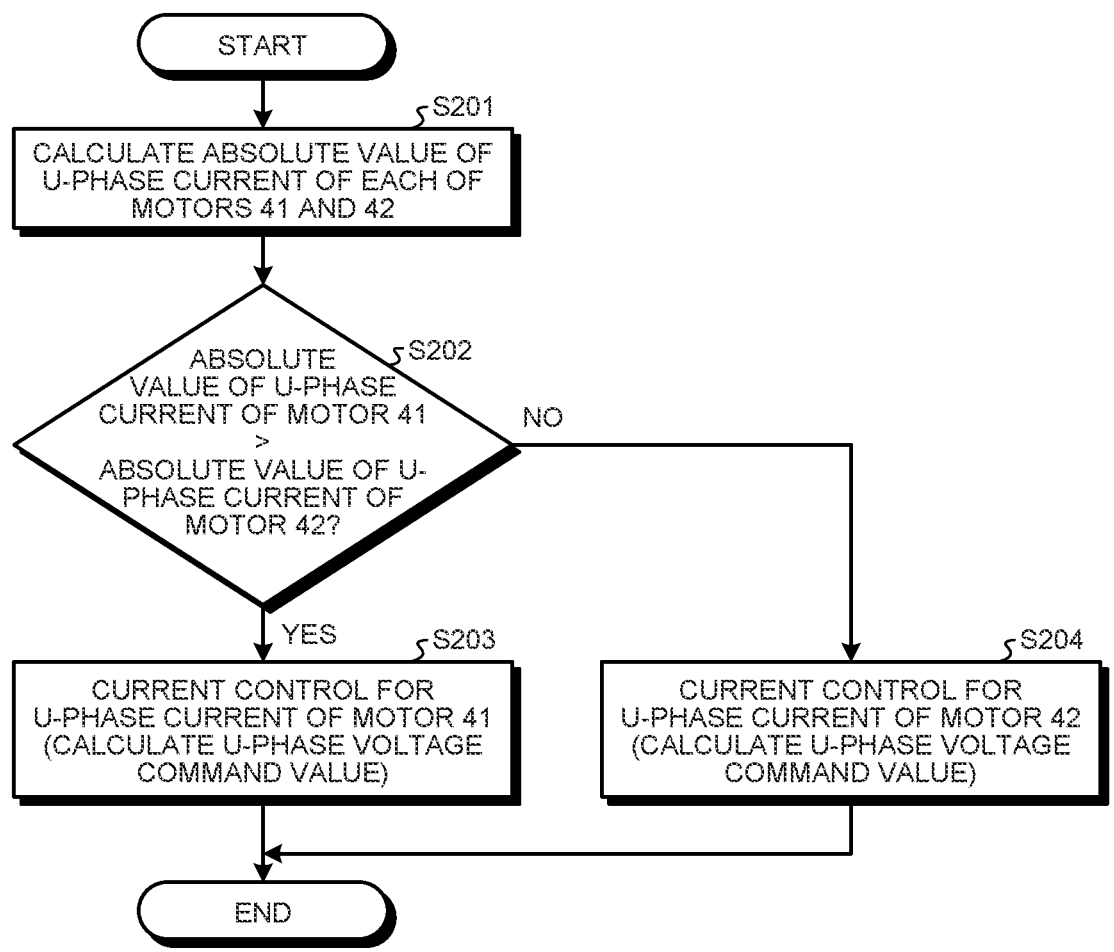
FIG. 8 is a flowchart for explaining the operation of a second motor control unit according to the first embodiment.

Next, the operation of the second motor control unit 24 according to the first embodiment will be described with reference to FIGS. 8 and 9. FIG. 8 is a flowchart for explaining the operation of the second motor control unit 24 according to the first embodiment. The procedure of the flowchart illustrated in FIG. 8 shows the details of step S108 in FIG. 7. FIG. 9 is a diagram illustrating an example of the behavior of each motor that occurs when control against step-out is performed according to the first embodiment. Although FIG. 8 describes current control for the U-phase current, the same applies to the V-phase current and the W-phase current.

In order to carry out the procedure of the flowchart of FIG. 8, the second motor control unit 24 receives input of the motor currents $i_{u\_m}$, $i_{v\_m}$, and $i_{w\_m}$ detected by the current detection unit 51 and input of the motor currents $i_{u\_sl}$, $i_{v\_sl}$, and $i_{w\_sl}$ detected by the current detection unit 52.

In step S201 of FIG. 8, the absolute value of the U-phase current of each of the motors 41 and 42 is calculated. In step S202, the absolute value of the U-phase current of the motor 41 is compared with the absolute value of the U-phase current of the motor 42. In response to determining that the absolute value of the U-phase current of the motor 41 is larger than the absolute value of the U-phase current of the motor 42 (step S202: Yes), the procedure proceeds to step S203. In contrast, in response to determining that the absolute value of the U-phase current of the motor 41 is less than or equal to the absolute value of the U-phase current of the motor 42 (step S202: No), the procedure proceeds to step S204.

In step S203, current control is performed for the U-phase current of the motor 41 having the larger current absolute value. In step S204, current control is performed for the U-phase current of the motor 42 having the larger current absolute value. The current control here can be performed using general PI control.

Once step-out occurs, the peak value of the motor current increases in the motor that is out of step. When the motor is a permanent magnet synchronous motor, for example, the flow of the motor current having a large peak value is liable to demagnetize the permanent magnet of the motor. Therefore, preferable control against step-out is to stop the motors while reducing the peak value of the motor current.

The flowchart of FIG. 8 is based on the premise that the number of motors is two, but the number of motors may be three or more, in which case current control is performed for the motor having the largest current absolute value. As a result, current control can be preferentially performed for the motor with a large current among the plurality of motors, and the peak value of the motor current can be reduced by a simple process.

In the determination process of step S202 described above, the case where the absolute value of the U-phase current of the motor 41 is equal to the absolute value of the U-phase current of the motor 42 is classified as "No", but this case may be classified as "Yes". That is, the case where the absolute value of the U-phase current of the motor 41 and the absolute value of the U-phase current of the motor 42 are equal may be classified as either "Yes" or "No".

An example of current control against step-out is to superimpose a harmonic component on the motor current.

In step S203 of FIG. 8, the current controller 241 generates the U-phase voltage command value $v_u^*$ such that a harmonic component is superimposed on the U-phase current of the motor 41. At this time, referring to FIG. 4, when the determination result Sout1 output from the step-out detection unit 22 is a signal indicating the occurrence of step-out, the PWM signal generation unit 20 generates PWM signals based on the U-phase voltage command value $v_u^*$ output from the second motor control unit 24. That is, when the determination result Sout1 is a signal indicating the occurrence of step-out, PWM signals are generated using the voltage command values $v_u^*$, $v_v^*$, and $v_w^*$ output from the second motor control unit 24, instead of the voltage command values $v_u^*$, $v_v^*$, and $v_w^*$ output from the coordinate conversion unit 19.

In the flowchart of FIG. 8, even though the determination results in step S202 may differ among the U, V, and W phases, step S202 and step S203 are individually executed. For example, the motor 41 can have a larger U-phase current and the motor 42 can have a larger V-phase current and a larger W-phase current, in which case the above control of superimposing a harmonic component is performed for each of the larger currents.

Note that the superimposition of a harmonic component on the motor current only needs to be performed by superimposing a harmonic component on the current command value to the current controller 241, but other methods may be used.

FIG. 9 depicts the behavior that occurs during a simulation of step-out in which the speed of the motor 42 is reduced and then a harmonic component is superimposed on the U-phase current of the motor 41 having a larger current absolute value. In FIG. 9, the horizontal axis represents time, the vertical axis of the waveforms in the upper part represents motor speed, and the vertical axis of the waveforms in the lower part represents current. Among the waveforms in the upper part, the thick solid line indicates the speed of the motor 41, and the thick broken line indicates the speed of the motor 42. Among the waveforms in the lower part, the thick solid line indicates the U-phase current of the motor 41, the thick broken line indicates the U-phase current of the motor 42, and the alternate long and short dash line indicates the U-phase current output from the inverter 4.

As illustrated in FIG. 9, the peak value of the U-phase current of each of the motors 41 and 42 is reduced to about ½ through the superimposition of a harmonic component on the U-phase current of the motor 41. After the peak values of the currents are successfully reduced to a level at which the permanent magnets of the motors can be prevented from being demagnetized, the motors 41 and 42 only need to be gradually decelerated according to the moment of inertia so that the motors 41 and 42 can be finally stopped.

Note that the above-described method of superimposing a harmonic component on the motor current is merely an example of current control against step-out, and other methods may be used. For example, the current command value to the current controller 241 may be controlled to 0 [A], that is, the current command value that is used in motor control may be controlled to zero. This control can also reduce the peak value of the motor current. When the control of superimposing a harmonic component and the control of setting the current command value to zero are performed, the output voltage of the inverter 4 is changed. Therefore, the first control can be rephrased as the control of applying a voltage for step-out control to each motor.

Although FIG. 4 depicts a configuration in which the second motor control unit 24 includes a controller that generates the voltage command values $v_u^*$, $v_v^*$, and $v_w^*$ of the stationary three-phase coordinate system and gives the voltage command values $v_u^*$, $v_v^*$, and $v_w^*$ to the PWM signal generation unit 20, the present invention is not limited to this configuration. Instead of the configuration illustrated in FIG. 4, a controller may be constructed that generates the dq-axis voltage command values $v_d^*$ and $v_q^*$ of the rotating two-phase coordinate system and gives the dq-axis voltage command values $v_d^*$ and $v_q^*$ to the coordinate conversion unit 19. At that time, dq-axis current values of the rotating two-phase coordinate system may be used, or αβ-axis current values of the two-phase fixed coordinate system obtained at the time of coordinate conversion into the dq axis may be used.

As described above, the motor drive device according to the first embodiment detects step-out in which the operating frequency of at least one of the motors does not match the inverter output frequency, or the operating frequency of at least one of the motors does not match the operating frequency of another one of the motors, and stops the plurality of motors by switching the energization state of the inverter when at least one of the motors is out of step. As a result, in the configuration that drives the plurality of motors with one inverter, it is possible to prevent or reduce the excessive current that can flow between the plurality of motors according to the difference between the induced voltages of the motors.

In addition, the motor drive device according to the first embodiment can prevent or reduce the excessive current that can flow between the motors, that is, excessive circulating current, and thus can reduce the risk of demagnetizing the permanent magnets of the motors when the motors are out of step.

Moreover, the motor drive device according to the first embodiment can be applied, for example, to the fan motors of an air conditioner (described later) to quickly stop the fan motors, which have a large moment of inertia. As a result, the time until restart can be shortened, and the performance of the air conditioner can be improved.

Second Embodiment

Figure 10:
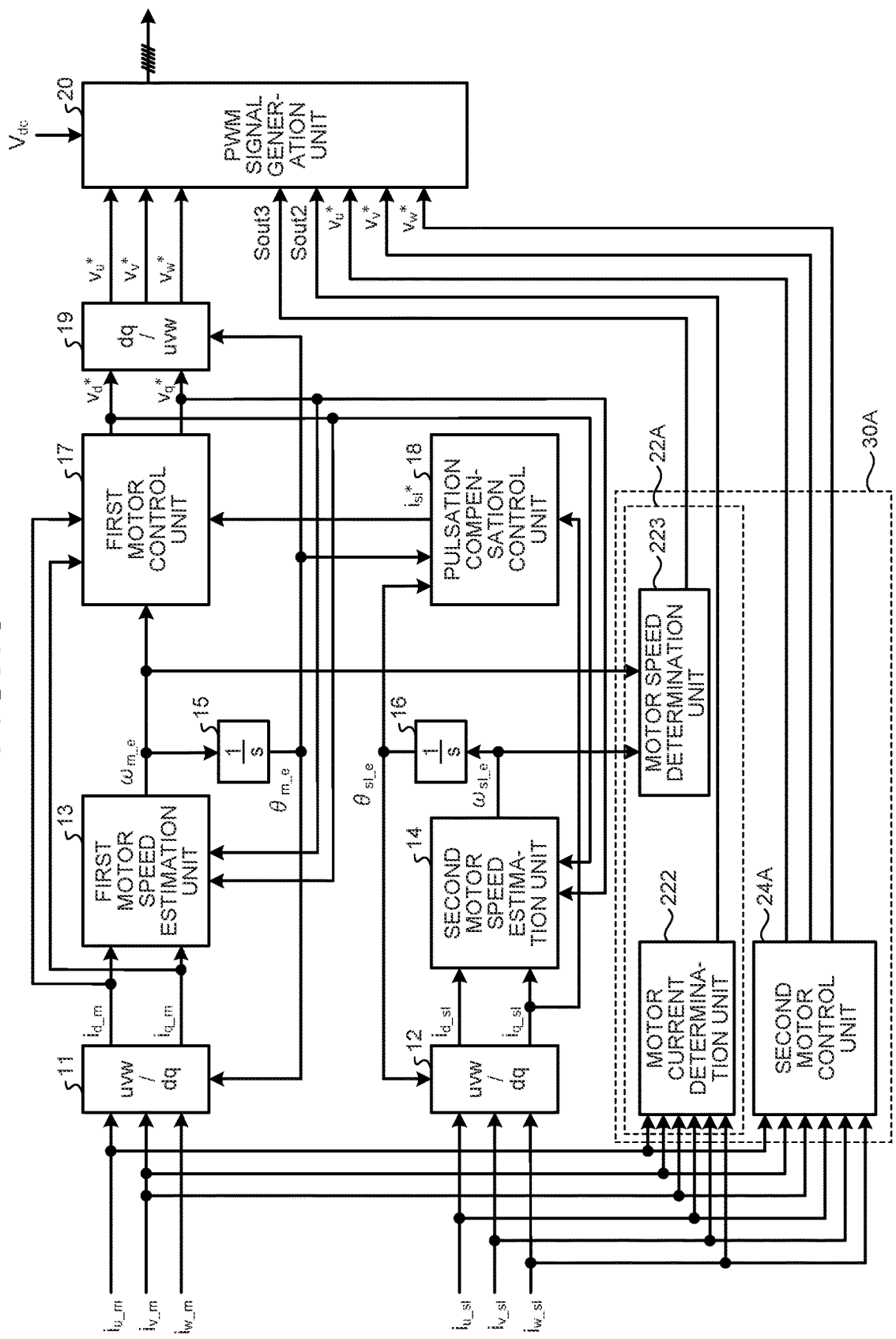
FIG. 10 is a block diagram illustrating an exemplary configuration of a control system constructed in a control device according to a second embodiment.

FIG. 10 is a block diagram illustrating an exemplary configuration of a control system constructed in a control device according to the second embodiment. The control system in FIG. 10 according to the second embodiment has the same configuration as the control system in FIG. 4 according to the first embodiment, except that the step-out control unit 30 is replaced with a step-out control unit 30A. In the step-out control unit 30A, the step-out detection unit 22 is replaced with a step-out detection unit 22A, and the second motor control unit 24 is replaced with a second motor control unit 24A. The step-out detection unit 22A includes a motor current determination unit 222 and a motor speed determination unit 223. The other parts of the configuration are the same as or equivalent to those in the first embodiment. The same or equivalent components are denoted by the same reference signs, and redundant descriptions are omitted.

The function of the second motor control unit 24A is different from the function of the second motor control unit 24. The details of the function of the second motor control unit 24A will be described later. In order to distinguish between the control by the second motor control unit 24 and the control by the second motor control unit 24A, the former may be referred to as the "first control" and the latter may be referred to as the "second control".

Figure 11:
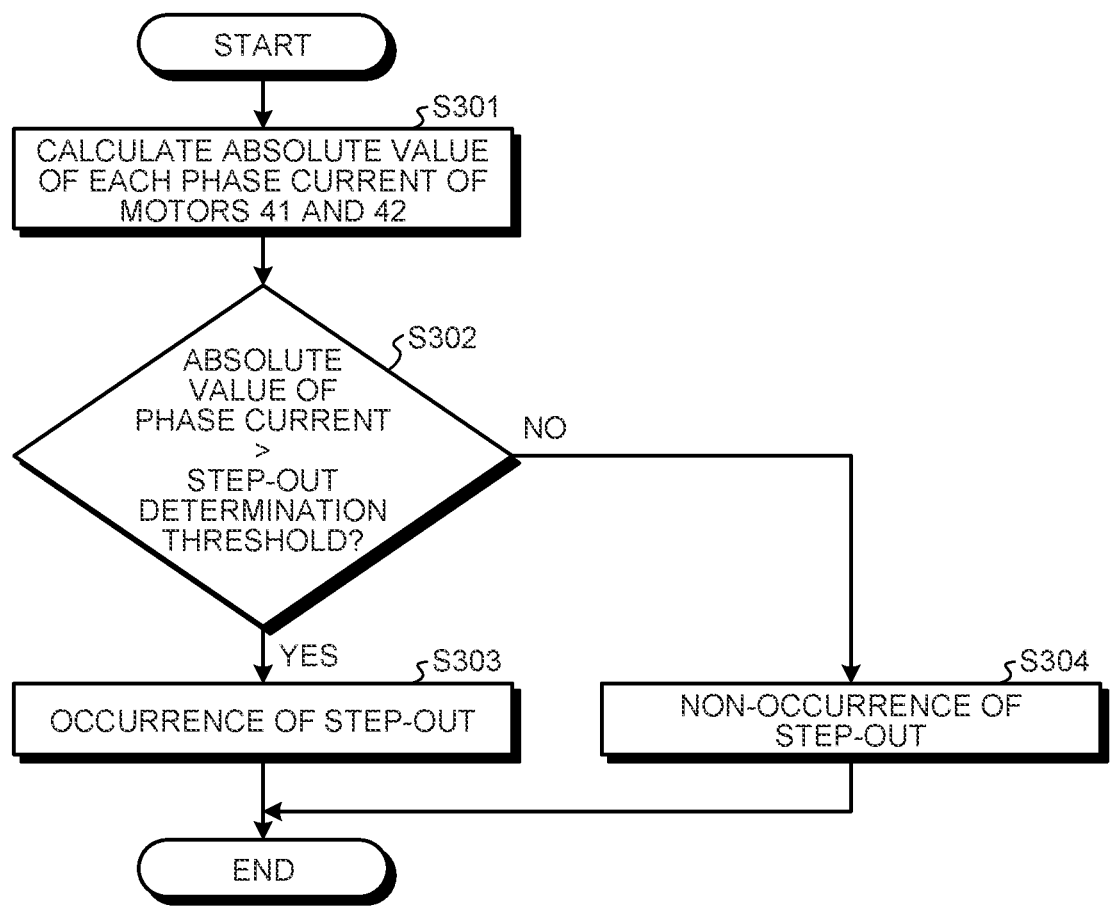
FIG. 11 is a flowchart for explaining the operation of a motor current determination unit according to the second embodiment.

Next, the operation of the main part according to the second embodiment will be described. First, FIG. 11 is a flowchart for explaining the operation of the motor current determination unit 222 according to the second embodiment. In FIG. 11, steps S301 and S302 are performed by the motor current determination unit 222, and step S303 is performed by the PWM signal generation unit 20 and the second motor control unit 24A.

In step S301 of FIG. 11, the absolute value of each phase current of the motors 41 and 42 is calculated. In step S302, the absolute value of each phase current is compared with a determination threshold for step-out determination. In response to determining that the absolute value of at least one phase current is larger than the determination threshold (step S302: Yes), it is determined that step-out has occurred (step S303). After determining that step-out has occurred, a determination result Sout2 indicating the occurrence of step-out is input to the PWM signal generation unit 20. In step S303, control against step-out is performed.

Specifically, in the second embodiment, PWM signals are generated to bring one or more of the upper-arm switching elements or the lower-arm switching elements of the inverter 4 to a conductive state. This control is performed based on the voltage command values $v_u^*$, $v_v^*$, and $v_w^*$ generated by the second motor control unit 24A. When one or more of the upper-arm switching elements or the lower-arm switching elements of the inverter 4 are brought to a conductive state, the windings of each motor (not illustrated) are short-circuited via the conductive switching element. Consequently, a current proportional to the induced voltage of each motor flows to the inverter 4, and the regenerative energy of each motor is consumed. As a result, the motors can be stopped in a shorter time than when each motor is decelerated according to the moment of inertia.

After step S303 is completed, the procedure of the flowchart of FIG. 11 ends. In step S302, in response to determining that the absolute values of all the phase currents are less than or equal to the determination threshold (step S302: No), it is determined that step-out has not occurred (step S304), and the determination result Sout2 indicating the non-occurrence of step-out is input to the PWM signal generation unit 20. In this case, the procedure of the flowchart of FIG. 11 ends without performing control by the second motor control unit 24A.

In the determination process of step S302 described above, the case where the absolute value of the phase current is equal to the determination threshold is classified as "No", but this case may be classified as "Yes". That is, the case where the absolute value of the phase current and the determination threshold are equal may be classified as either "Yes" or "No".

Figure 12:
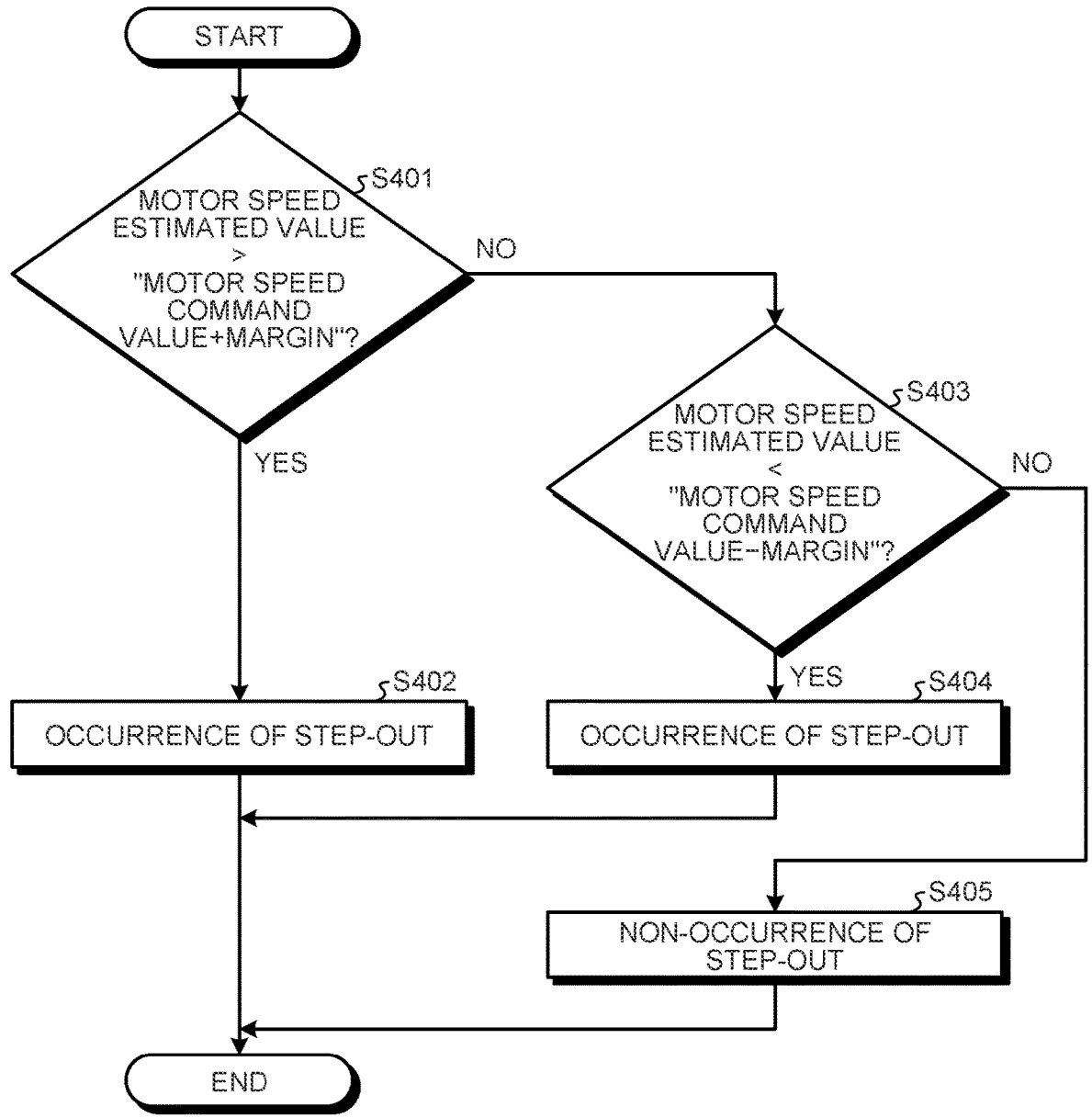
FIG. 12 is a flowchart for explaining the operation of a motor speed determination unit according to the second embodiment.

FIG. 12 is a flowchart for explaining the operation of the motor speed determination unit 223 according to the second embodiment. In FIG. 12, steps S401 and S403 are performed by the motor speed determination unit 223, and steps S402 and S404 are performed by the PWM signal generation unit 20 and the second motor control unit 24A.

In order to carry out the procedure of the flowchart of FIG. 12, the motor speed determination unit 223 receives input of the motor speed estimated value $\omega_{m\_e}$ estimated by the first motor speed estimation unit 13 and the motor speed estimated value $\omega_{sl\_e}$ estimated by the second motor speed estimation unit 14.

In step S401 of FIG. 12, for each of the motors 41 and 42, the motor speed estimated value and the motor speed command value are compared. For determining the magnitude relationship between the motor speed estimated value and the motor speed command value, it is preferable to provide a margin to the motor speed command value in order to prevent erroneous determinations or inconsistent determinations.

In step S401, in response to determining that the motor speed estimated value of at least one motor is larger than "motor speed command value+margin" (step S401: Yes), it is determined that step-out has occurred (step S402). After determining that step-out has occurred, a determination result Sout3 indicating the occurrence of step-out is input to the PWM signal generation unit 20. In step S402, control against step-out is performed.

In contrast, in response to determining in step S401 that the motor speed estimated values of all the motors are less than or equal to "motor speed command value+margin" (step S401: No), the procedure proceeds to step S403. In step S403, in response to determining that the motor speed estimated value of any of the motors is less than "motor speed command value-margin" (step S403: Yes), it is determined that step-out has occurred (step S404). After determining that step-out has occurred, the determination result Sout3 indicating the occurrence of step-out is input to the PWM signal generation unit 20. In step S404, control against step-out is performed.

In step S403, in response to determining that the motor speed estimated values of all the motors are larger than or equal to "motor speed command value-margin" (step S403: No), it is determined that step-out has not occurred (step S405), and the determination result Sout3 indicating the non-occurrence of step-out is input to the PWM signal generation unit 20. In this case, the procedure of the flowchart of FIG. 12 ends without performing control by the second motor control unit 24A.

In contrast, in the case of the occurrence of step-out, the above-mentioned control by the second motor control unit 24A is performed. The details of the processing are as described above, and will not be described here.

In the second embodiment, the control by the second motor control unit 24A is performed when at least one of the determination results Sout2 and Sout3 indicates the occurrence of step-out, and is not performed when both the determination results Sout2 and Sout3 indicate the non-occurrence of step-out.

In the determination process of step S401 described above, the case where the motor speed estimated value of the motor is equal to "motor speed command value+margin" is classified as "No", but this case may be classified as "Yes". That is, the case where the motor speed estimated value of the motor and "motor speed command value+margin" are equal may be classified as either "Yes" or "No".

In the determination process of step S403 described above, the case where the motor speed estimated value of the motor is equal to "motor speed command value-margin" is classified as "No", but this case may be classified as "Yes". That is, the case where the motor speed estimated value of the motor and "motor speed command value-margin" are equal may be classified as either "Yes" or "No".

As described above, the motor drive device according to the second embodiment performs the second control by the second motor control unit 24A when at least one of the step-out determination result based on the motor current and the step-out determination result based on the motor speed indicates the occurrence of step-out. Consequently, a current proportional to the induced voltage of each motor flows to the inverter 4, and the regenerative energy of each motor is consumed. As a result, the motors can be stopped in a shorter time than when each motor is decelerated according to the moment of inertia.

Figure 13:
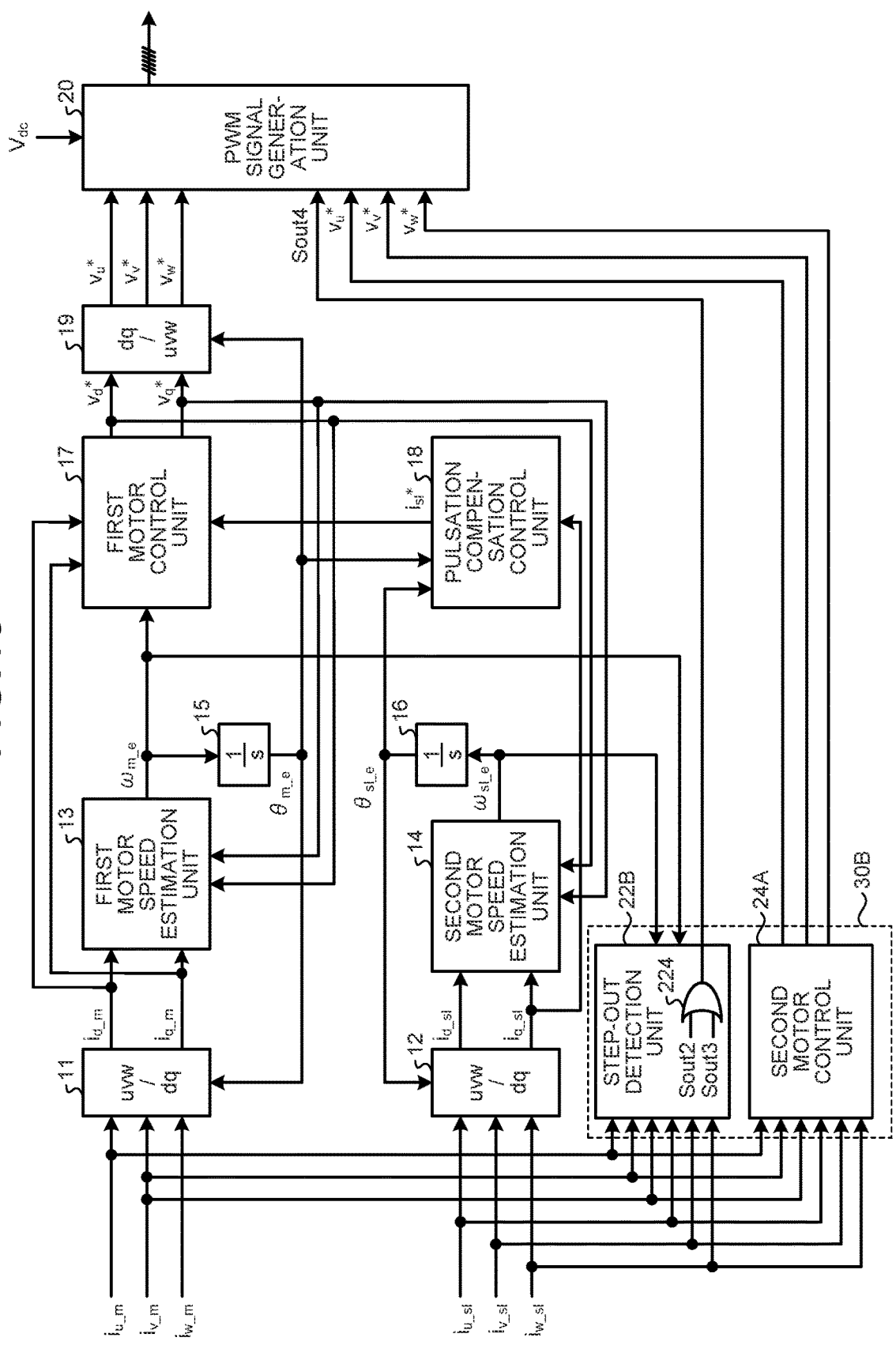
FIG. 13 is a block diagram illustrating a first modification of the control system constructed in the control device according to the second embodiment.

In FIG. 10, the motor current determination unit 222 and the motor speed determination unit 223 are provided inside the step-out detection unit 22A, and the determination results Sout2 and Sout3 by these determination units are separately input to the PWM signal generation unit 20. However, the present invention is not limited to this configuration. Specifically, instead of the configuration in FIG. 10, the configuration in FIG. 13 may be used. FIG. 13 is a block diagram illustrating a first modification of the control system constructed in the control device according to the second embodiment.

The control system of the control device in FIG. 13 according to the first modification of the second embodiment has the same configuration as the control system of the control device in FIG. 10, except that the step-out control unit 30A is replaced with a step-out control unit 30B. In the step-out control unit 30B, the step-out detection unit 22A is replaced with a step-out detection unit 22B. In FIG. 13, the motor current determination unit 222 and the motor speed determination unit 223 are not illustrated. The step-out detection unit 22B includes an OR circuit 224. The OR circuit 224 receives input of the determination results Sout2 and Sout3 described in the example of FIG. 10. The OR circuit 224 outputs the OR of the determination results Sout2 and Sout3 to the PWM signal generation unit 20 as a determination result Sout4 by the step-out detection unit 22B. Based on the determination result Sout4, the PWM signal generation unit 20 performs the second control described above to bring one or more of the upper-arm switching elements or the lower-arm switching elements of the inverter 4 to a conductive state.

Figure 14:
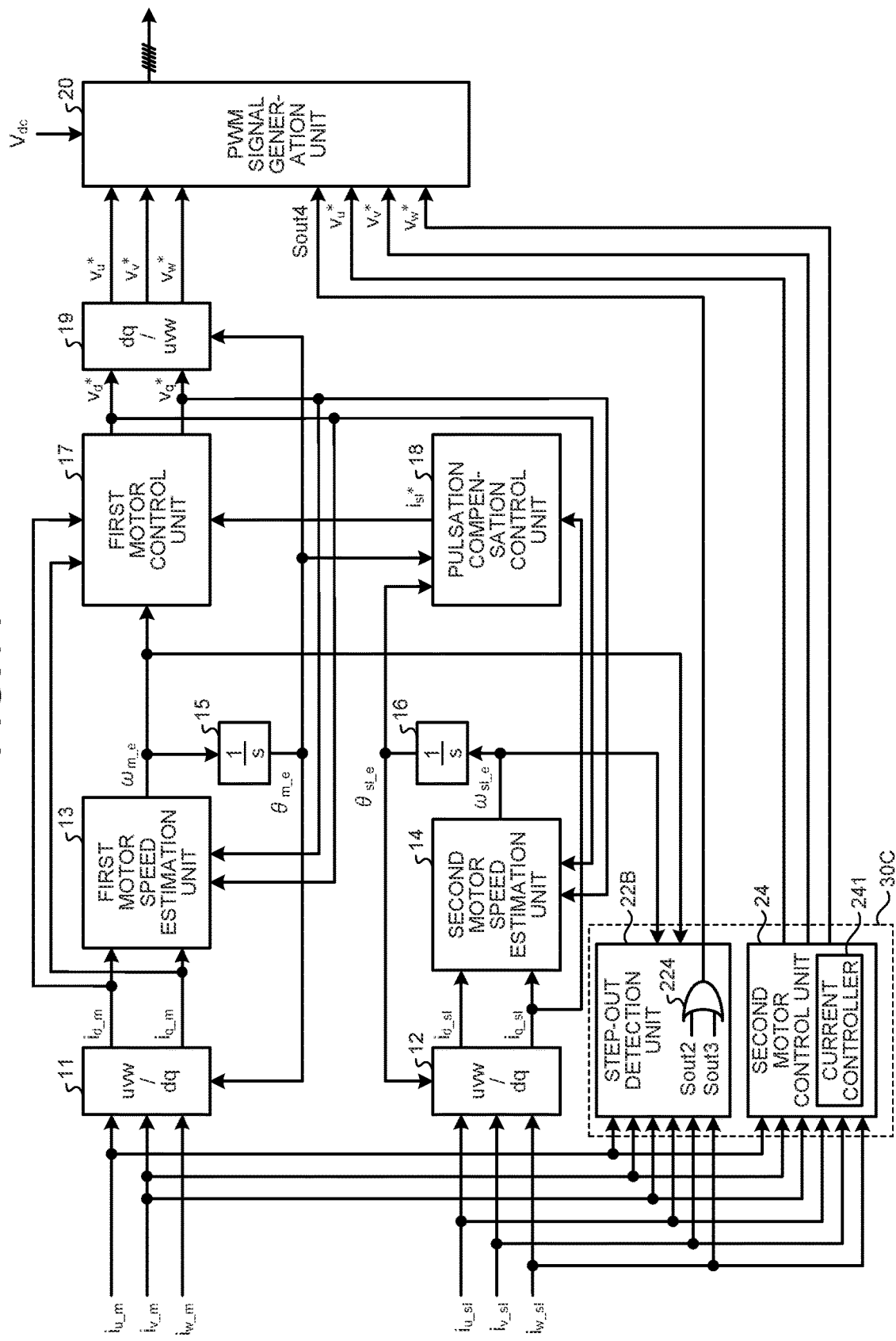
FIG. 14 is a block diagram illustrating a second modification of the control system constructed in the control device according to the second embodiment.

Alternatively, instead of the configuration in FIG. 10, the configuration in FIG. 14 may be used. FIG. 14 is a block diagram illustrating a second modification of the control system constructed in the control device according to the second embodiment.

The control system of the control device in FIG. 14 according to the second modification of the second embodiment has the same configuration as the control system of the control device in FIG. 13, except that the step-out control unit 30B is replaced with a step-out control unit 30C. In the step-out control unit 30C, the second motor control unit 24A is replaced with the second motor control unit 24. The second motor control unit 24 is the same as that illustrated in FIG. 4. The other parts of the configuration are the same as or equivalent to those in FIG. 13. The same or equivalent components are denoted by the same reference signs, and redundant descriptions are omitted.

In the case of the control device according to the second modification of the second embodiment, the second motor control unit 24 performs the first control of stopping the motors while reducing the peak value of the motor current, as described in the first embodiment. In this first control, as described above, the current control of superimposing a harmonic component on the motor current may be performed, or the current control of setting the current command value to 0 [A], for example, may be performed.

Third Embodiment

Figure 15:
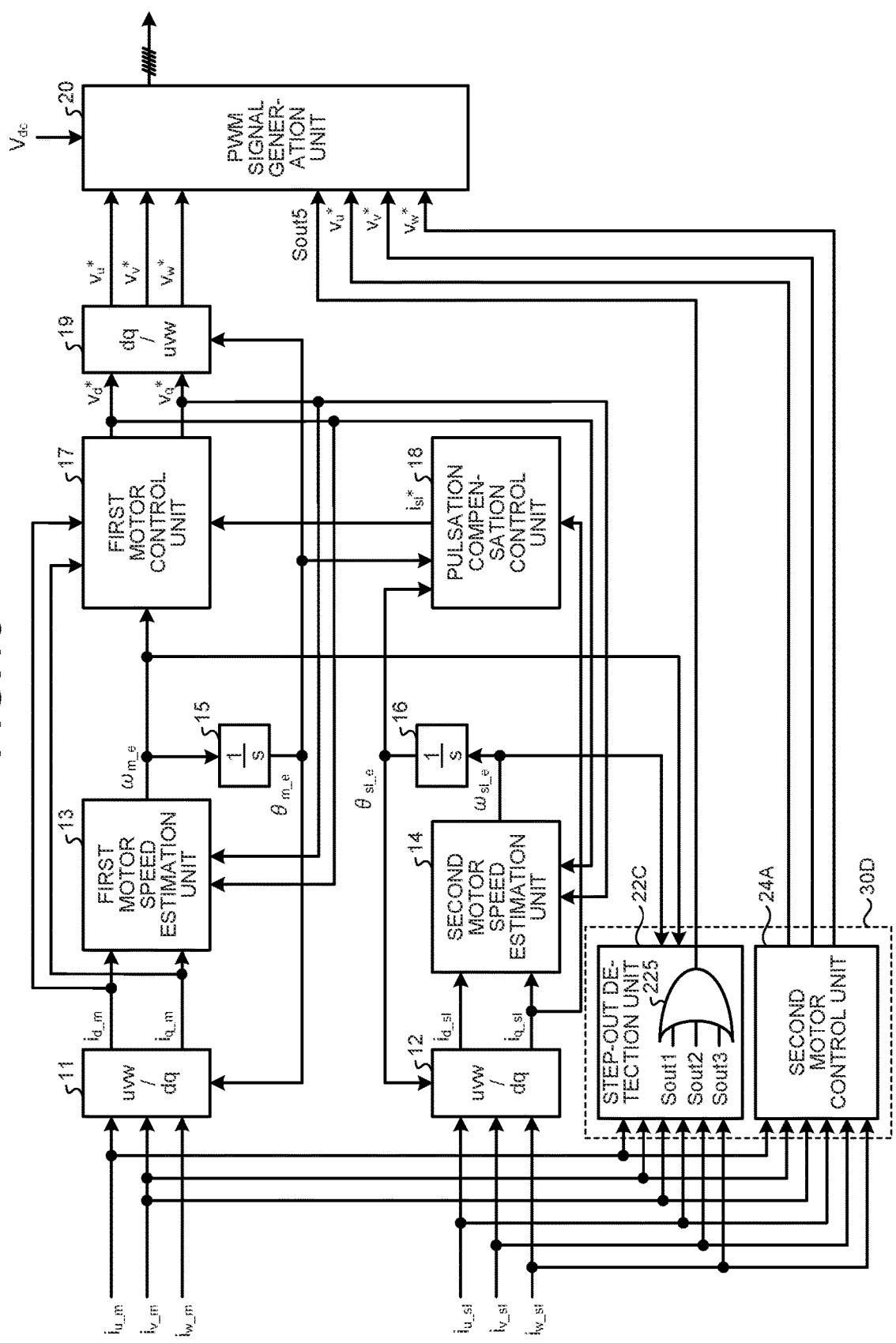
FIG. 15 is a block diagram illustrating an exemplary configuration of a control system constructed in a control device according to a third embodiment.

FIG. 15 is a block diagram illustrating an exemplary configuration of a control system constructed in a control device according to the third embodiment. The control system in FIG. 15 according to the third embodiment has the same configuration as that in FIG. 13 according to the first modification of the second embodiment, except that the step-out control unit 30B is replaced with a step-out control unit 30D. In the step-out control unit 30D, the step-out detection unit 22B is replaced with a step-out detection unit 22C, and the OR circuit 224 is replaced with an OR circuit 225. The step-out detection unit 22C is obtained by adding the function of the current direction determination unit 221 illustrated in FIG. 4 to the function of the step-out detection unit 22B illustrated in FIG. 13. In FIG. 15, the current direction determination unit 221, the motor current determination unit 222, and the motor speed determination unit 223 are not illustrated. The other parts of the configuration are the same as or equivalent to those in the first embodiment. The same or equivalent components are denoted by the same reference signs, and redundant descriptions are omitted.

The OR circuit 225 receives input of the determination results Sout1, Sout2, and Sout3 from the current direction determination unit 221, the motor current determination unit 222, and the motor speed determination unit 223, respectively. The OR circuit 225 outputs the OR of the determination results Sout1, Sout2, and Sout3 to the PWM signal generation unit 20 as a determination result Sout5 by the step-out detection unit 22C. Based on the determination result Sout5, the PWM signal generation unit 20 performs the second control described above to bring one or more of the upper-arm switching elements or the lower-arm switching elements of the inverter 4 to a conductive state.

In the case of the control device according to the third embodiment, three determination conditions are provided, and when at least one of the determination conditions indicates the occurrence of step-out, control against step-out is performed. This is effective in performing control against step-out by accurately identifying signs of step-out.

In the third embodiment illustrated in FIG. 15, the second control is performed when at least one of the motors is out of step, but the present invention is not limited to this configuration. As in the case of FIG. 14, the first control may be performed when at least one of the motors is out of step. In addition, both the first control and the second control functions may be provided so that switching between the first control and the second control can be performed on a time-series basis. That is, the first control may be performed first, followed by the switching from the first control to the second control. Alternatively, the second control may be performed first, followed by the switching from the second control to the first control. As a result, it is possible to shorten the suspension time of the motors while reducing the peak value of each motor current in the initial stage of the occurrence of step-out.

Fourth Embodiment

Figure 16:
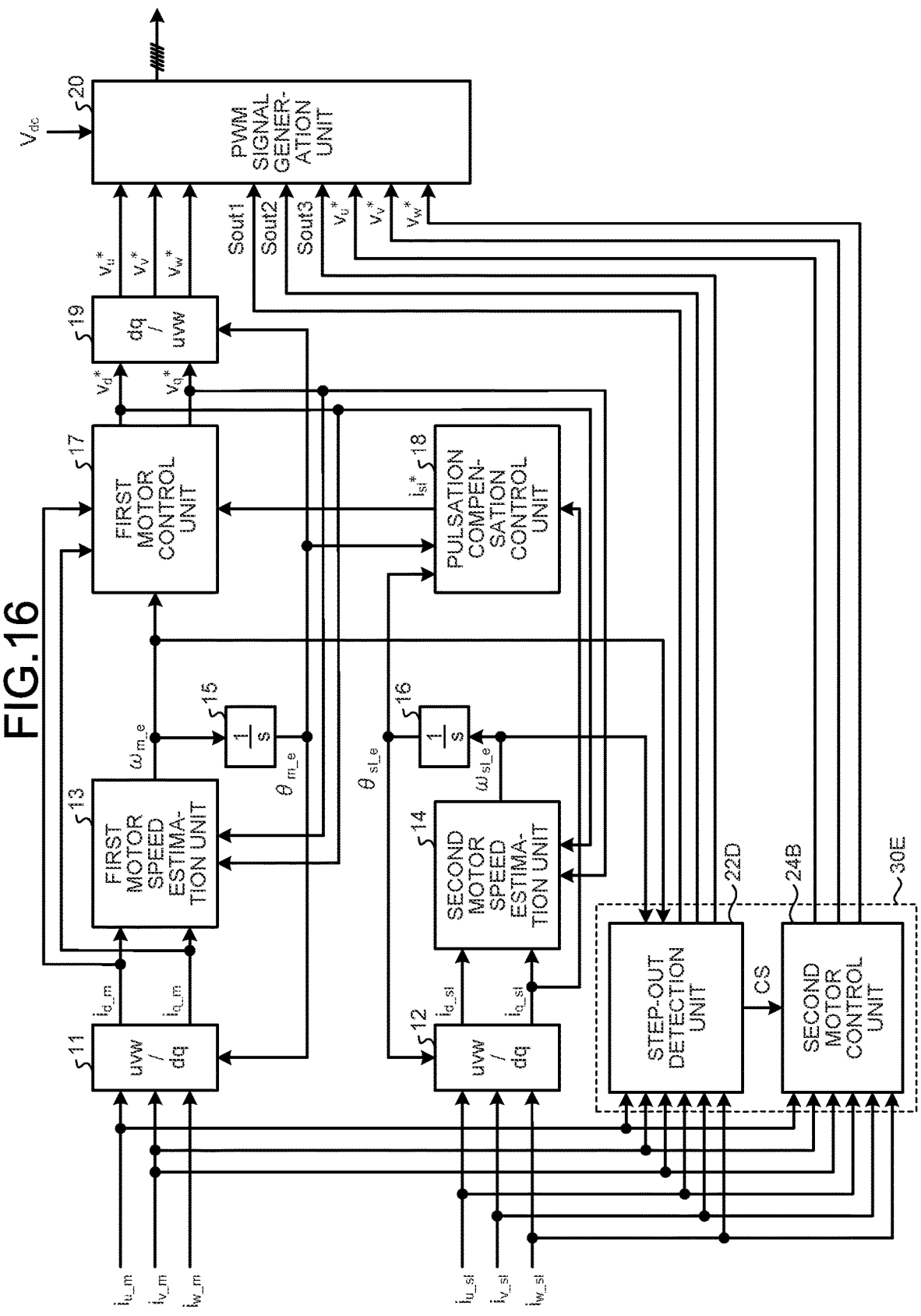
FIG. 16 is a block diagram illustrating an exemplary configuration of a control system constructed in a control device according to a fourth embodiment.

FIG. 16 is a block diagram illustrating an exemplary configuration of a control system constructed in a control device according to the fourth embodiment. The control system in FIG. 16 according to the fourth embodiment has the same configuration as the control device in FIG. 15 according to the third embodiment, except that the step-out control unit 30D is replaced with a step-out control unit 30E. In the step-out control unit 30E, the step-out detection unit 22C is replaced with a step-out detection unit 22D, and the second motor control unit 24A is replaced with a second motor control unit 24B. The second motor control unit 24B has the functions of both the second motor control unit 24 and the second motor control unit 24A. In FIG. 16, the second motor control unit 24B is configured to receive input of determination information CS from the step-out detection unit 22D. The other parts of the configuration are the same as or equivalent to those in the third embodiment. The same or equivalent components are denoted by the same reference signs, and redundant descriptions are omitted.

Figure 17:
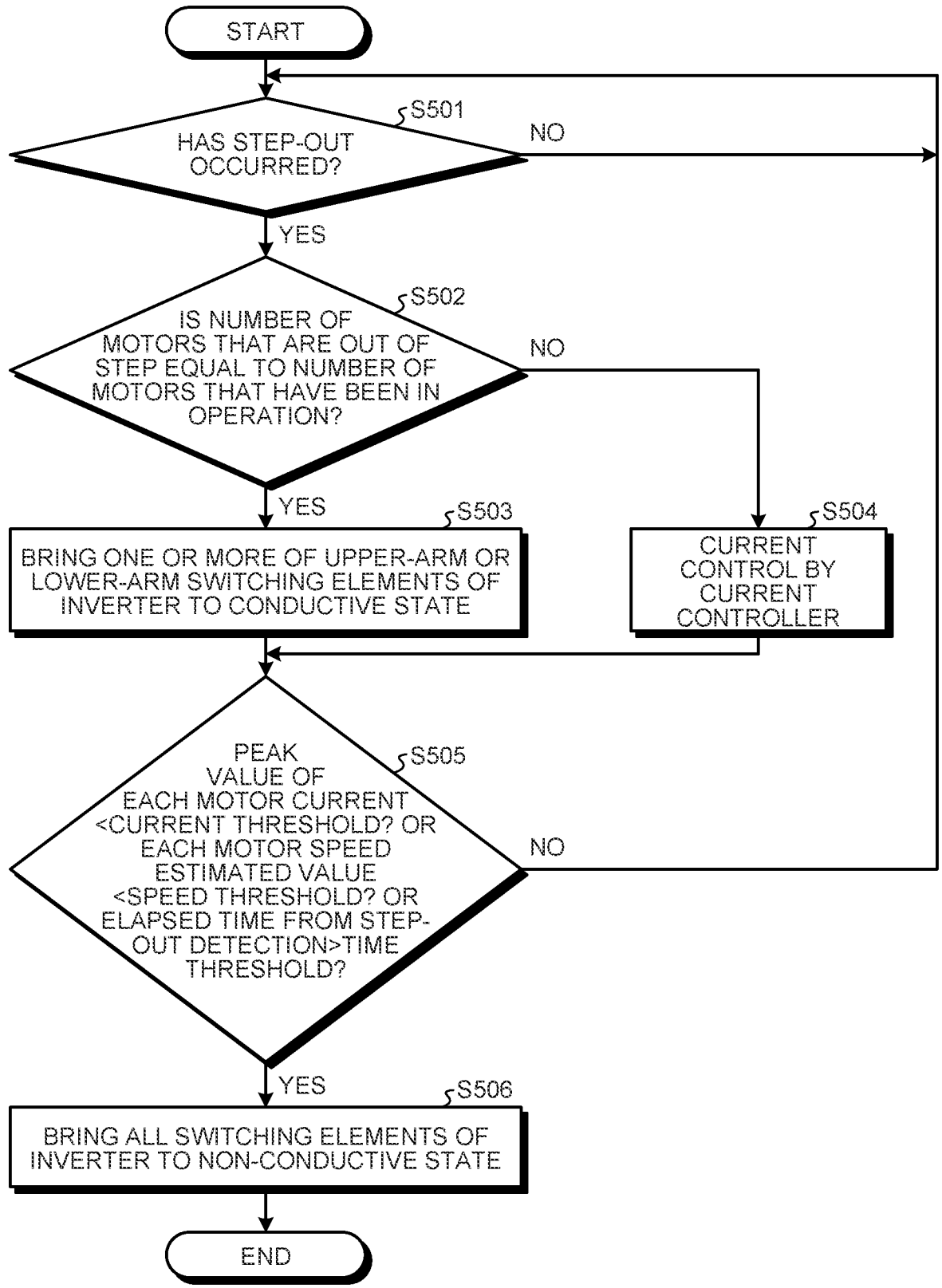
FIG. 17 is a flowchart for explaining the operation of a step-out detection unit and a second motor control unit according to the fourth embodiment.

Next, the operation of the main part according to the fourth embodiment will be described. FIG. 17 is a flowchart for explaining the operation of the step-out detection unit 22D and the second motor control unit 24B according to the fourth embodiment. In FIG. 17, steps S501, S502, and S505 are performed by the step-out detection unit 22D, and steps S503, S504, and S506 are performed by the PWM signal generation unit 20 and the second motor control unit 24B.

In step S501 of FIG. 17, it is determined whether step-out has occurred. The determination as to whether step-out has occurred uses any of the current direction determination unit 221, the motor current determination unit 222, and the motor speed determination unit 223, or at least one of these determination units. Unless step-out is detected (step S501: No), the determination process of step S501 is continued. In contrast, in response to detecting step-out (step S501: Yes), the procedure proceeds to step S502.

In step S502, it is determined whether the number of motors that are out of step is equal to the number of motors that have been in operation. In response to determining that the number of motors that are out of step and the number of motors that have been in operation are equal (step S502: Yes), the procedure proceeds to step S503. In step S503, the second control suitable for this situation is selected and performed. The second control is, as described above, the control of bringing one or more of the upper-arm or lower-arm switching elements of the inverter 4 to a conductive state. Note that the step-out detection unit 22D notifies the second motor control unit 24B of the occurrence or non-occurrence of step-out using the determination information CS. The same applies to the subsequent processes.

In response to determining that the number of motors that are out of step and the number of motors that have been in operation are different (step S502: No), the procedure proceeds to step S504. In step S504, the first control suitable for this situation is selected and performed. As described above, the first control is current control that is performed by the current controller 241 provided in the second motor control unit 24 of FIG. 4.

After steps S503 and S504, the procedure proceeds to step S505. In step S505, the peak value of each motor current is compared with a current threshold, each motor speed estimated value is compared with a speed threshold, and the elapsed time from step-out detection is compared with a time threshold. In response to determining in step S505 that the peak value of each motor current is less than the current threshold, each motor speed estimated value is less than the speed threshold, or the elapsed time from step-out detection is larger than the time threshold (step S505: Yes), the procedure proceeds to step S506. That is, the condition for proceeding to step S506 is that at least one of the peak value of each motor current, each motor speed estimated value, and the elapsed time from step-out detection meets the determination condition that is based on each threshold.

In contrast, in response to determining that the peak value of each motor current is larger than or equal to the current threshold, each motor speed estimated value is larger than or equal to the speed threshold, and the elapsed time from step-out detection is less than or equal to the time threshold (step S505: No), the procedure returns to step S501, and steps S501 to S504 are repeated. That is, the condition for returning to step S501 is that none of the peak value of each motor current, each motor speed estimated value, and the elapsed time from step-out detection meets the determination condition that is based on each threshold.

In step S506, control is performed to bring all the switching elements of the inverter 4 to a non-conductive state. Hereinafter, this control will be appropriately referred to as the "third control" to be distinguished from the first control and the second control described above. This third control cuts off the output voltage to each motor output from the inverter 4. In addition, because the electrical connection between the inverter 4 and each motor is eliminated, the current that flows in proportion to the induced voltage of each motor flows as a circulating current between the motors. This circulating current can consume the regenerative energy of each motor, whereby each motor can be stopped in a shorter time than when each motor is stopped according to the moment of inertia.

As described above, the motor drive device according to the fourth embodiment selects the control suitable for the situation of the difference between the number of motors that are out of step and the number of motors that have been in operation based on the information of the difference. As a result, it is possible to safely and reliably perform control for shortening the suspension time of the motors while reducing the peak value of each motor current in the initial stage of the occurrence of step-out.

Fifth Embodiment

Figure 18:
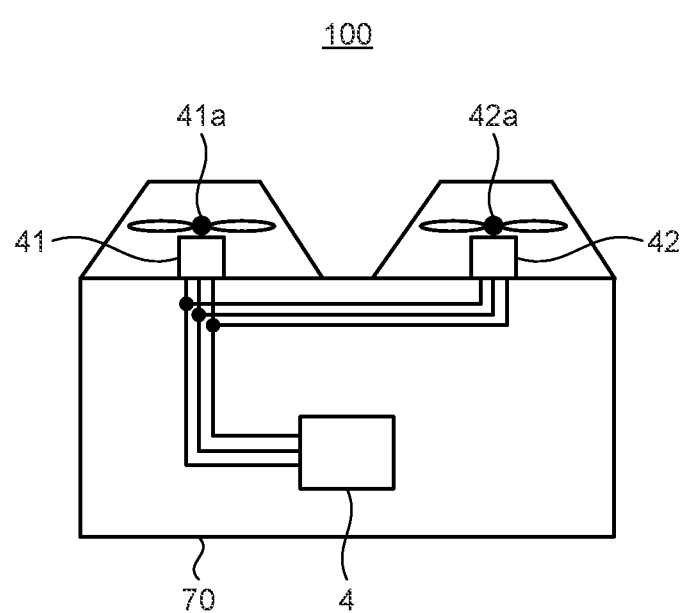
FIG. 18 is a diagram illustrating an example of application of a motor drive device to an air conditioner according to a fifth embodiment.

The fifth embodiment describes an example of application of the motor drive device described in any of the first to fourth embodiments. FIG. 18 is a diagram illustrating an example of application of a motor drive device to an air conditioner according to the fifth embodiment.

In FIG. 18, an outdoor unit 70 of the air conditioner 100 is equipped with the inverter 4, a plurality of fans 41a and 42a, and the motors 41 and 42 for driving the fans 41a and 42a. In the case of driving the two fans 41a and 42a in the air conditioner 100, the number of inverters 4 can be reduced by operating the two motors 41 and 42 with the one inverter 4. As a result, the cost of the air conditioner 100 can be reduced.

The fifth embodiment has described an example of application of the motor drive device according to any of the first to fourth embodiments to an air conditioner, but the present invention is not limited to this example. The motor drive device according to any of the first to fourth embodiments may be applied to refrigeration cycle equipment such as heat pump water heaters, refrigerators, and freezers. In any case, the effects of each embodiment can be achieved.

The configurations described in the above-mentioned embodiments indicate examples of the contents of the present invention. The configurations can be combined with another well-known technique, and some of the configurations can be omitted or changed in a range not departing from the gist of the present invention.

For example, in the above description, the step-out control units detect that a motor is out of step based on a change in the direction of the motor current flowing through each phase of the plurality of motors, a detected value of the motor current, or an estimated speed value of the plurality of motors, but the present invention is not limited to this. The step-out control units may detect that a motor is out of step using at least two determination criteria of a change in the direction of the motor current flowing through each phase of the plurality of motors, a detected value of the motor current, and an estimated speed value of the plurality of motors.

In addition, in the description of the third embodiment, switching between the first control and the second control is performed on a time-series basis when at least one of the motors is out of step, but the present invention is not limited to this. By adding the third control described in the fourth embodiment, switching between the first control, the second control, and the third control may be performed on a time-series basis.

The invention claimed is:
1. A motor drive device comprising:
one inverter that drives a plurality of motors; and
a step-out control unit that detects step-out in which an operating frequency of at least one of the motors does not match an inverter output frequency, or an operating frequency of at least one of the motors does not match an operating frequency of another one of the motors, and stops the plurality of motors by switching an energization state of the inverter when at least one of the motors is out of step, wherein when at least one of the motors is out of step, first control is performed to apply a voltage for step-out control to the motors.

2. The motor drive device according to claim 1, wherein the step-out control unit detects that the motors are out of step based on a change in a direction of a motor current flowing through each phase of the plurality of motors, a detected value of the motor current, or an estimated speed value of the plurality of motors.

3. The motor drive device according to claim 1, wherein the step-out control unit detects that the motors are out of step using at least two of a change in a direction of a motor current flowing through each phase of the plurality of motors, a detected value of the motor current, and an estimated speed value of the plurality of motors.

4. The motor drive device according to claim 1, wherein in the first control, a harmonic component is superimposed on a motor current flowing through each phase of the motors.

5. The motor drive device according to claim 1, wherein in the first control, a current command value that is used in motor control is controlled to zero.

6. The motor drive device according to claim 1, wherein when at least one of the motors is out of step, the first control is performed in response to determining that the number of motors that are out of step is different from the number of motors that have been in operation.

7. The motor drive device according to claim 6, wherein when at least one of the motors is out of step, in response to a peak value of a current flowing through each phase of the motor falling below a current threshold after the first control is performed, third control is performed to cut off an output voltage from the inverter.

8. The motor drive device according to claim 6, wherein when at least one of the motors is out of step, in response to an estimated speed value of the motor falling below a speed threshold after the first control is performed, third control is performed to cut off an output voltage from the inverter.

9. The motor drive device according to claim 6, wherein when at least one of the motors is out of step, in response to an elapsed time from step-out detection exceeding a time threshold after the first control is performed, third control is performed to cut off an output voltage from the inverter.

10. An air conditioner comprising the motor drive device according to claim 1.

11. A motor drive device comprising:
one inverter that drives a plurality of motors; and
a step-out control unit that detects step-out in which an operating frequency of at least one of the motors does not match an inverter output frequency, or an operating frequency of at least one of the motors does not match an operating frequency of another one of the motors, and stops the plurality of motors by switching an energization state of the inverter when at least one of the motors is out of step, wherein
when at least one of the motors is out of step, second control is performed to bring one or more of upper-arm switching elements or lower-arm switching elements of the inverter to a conductive state.

12. The motor drive device according to claim 11, wherein when at least one of the motors is out of step, the second control is performed in response to determining that the number of motors that are out of step is equal to the number of motors that have been in operation.

13. The motor drive device according to claim 12, wherein
when at least one of the motors is out of step, in response to a peak value of a current flowing through each phase of the motor falling below a current threshold after the second control is performed, third control is performed to cut off an output voltage from the inverter.

14. The motor drive device according to claim 12, wherein
when at least one of the motors is out of step, in response to an estimated speed value of the motor falling below a speed threshold after the second control is performed, third control is performed to cut off an output voltage from the inverter.

15. The motor drive device according to claim 12, wherein
when at least one of the motors is out of step, in response to an elapsed time from step-out detection exceeding a time threshold after the second control is performed, third control is performed to cut off an output voltage from the inverter.

16. An air conditioner comprising the motor drive device according to claim 11.

17. A motor drive device comprising:
one inverter that drives a plurality of motors; and
a step-out control unit that detects step-out in which an operating frequency of at least one of the motors does not match an inverter output frequency, or an operating frequency of at least one of the motors does not match an operating frequency of another one of the motors, and stops the plurality of motors by switching an energization state of the inverter when at least one of the motors is out of step, wherein
when at least one of the motors is out of step, switching between first control, second control, and third control is performed on a time-series basis, the first control being to apply a voltage for step-out control to the motors, the second control being to bring one or more of upper-arm switching elements or lower-arm switching elements of the inverter to a conductive state, the third control being to cut off an output voltage from the inverter.

18. An air conditioner comprising the motor drive device according to claim 17.

* * * * *